US009095777B2

United States Patent
Kondo

(10) Patent No.: US 9,095,777 B2
(45) Date of Patent: Aug. 4, 2015

(54) INFORMATION PROCESSING DEVICE, METHOD FOR CONTROLLING INFORMATION PROCESSING DEVICE, PROGRAM, AND INFORMATION STORAGE MEDIUM

(75) Inventor: Ippei Kondo, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 658 days.

(21) Appl. No.: 13/496,784

(22) PCT Filed: Feb. 24, 2010

(86) PCT No.: PCT/JP2010/052896
§ 371 (c)(1),
(2), (4) Date: Mar. 16, 2012

(87) PCT Pub. No.: WO2011/033795
PCT Pub. Date: Mar. 24, 2011

(65) Prior Publication Data
US 2012/0169592 A1    Jul. 5, 2012

(30) Foreign Application Priority Data

Sep. 17, 2009   (JP) .................................. 2009-215558

(51) Int. Cl.
*G09G 5/00*     (2006.01)
*A63F 13/40*    (2014.01)
(Continued)

(52) U.S. Cl.
CPC ................. *A63F 13/10* (2013.01); *A63F 13/06* (2013.01); *G06F 3/0235* (2013.01);
(Continued)

(58) Field of Classification Search
CPC ....................................................... G06F 3/0488
See application file for complete search history.

(56) References Cited

U.S. PATENT DOCUMENTS 6,402,616 B1 *   6/2002   Ogata et al. ..................... 463/37
2006/0246974 A1 *  11/2006   Tsuda et al. ..................... 463/7
(Continued)

FOREIGN PATENT DOCUMENTS

EP        1808211 A2     7/2007
JP        63-219030 A    9/1988
(Continued)

OTHER PUBLICATIONS

Japanese Office Action dated Feb. 19, 2013 issued for Japanese Application No. 2009-215558.
(Continued)

*Primary Examiner* — Kenneth B Lee, Jr.
(74) *Attorney, Agent, or Firm* — Sughrue Mion, PLLC

(57) ABSTRACT

Direction obtaining means (72) obtains pressing-force information relating to pressing forces applied respectively to the plurality of depression units. In a case where a first depression unit and a second depression unit are pressed, the direction obtaining means (72) obtains a direction between a first basic direction and a second basic direction based on pressing forces applied respectively to the first depression unit and the second depression unit. The direction obtained by the direction obtaining means (72) in a case where the first depression unit and the second depression unit are pressed changes based on the pressing forces applied respectively to the first depression unit and the second depression unit. Processing executing means (74) executes processing based on the direction obtained by the direction obtaining means (72).

13 Claims, 15 Drawing Sheets

(51) Int. Cl.
    *A63F 13/20* (2014.01)
    *G06F 3/023* (2006.01)
    *G06F 3/0489* (2013.01)

(52) U.S. Cl.
    CPC .... *G06F 3/04892* (2013.01); *A63F 2300/1056* (2013.01); *A63F 2300/6045* (2013.01); *A63F 2300/8011* (2013.01)

(56) References Cited

U.S. PATENT DOCUMENTS

| | | |
|---|---|---|
| 2008/0234022 A1 | 9/2008 | Suzuki et al. |
| 2009/0309830 A1 | 12/2009 | Yamamoto et al. |
| 2010/0240429 A1 | 9/2010 | Chosogabe |

FOREIGN PATENT DOCUMENTS

| | | |
|---|---|---|
| JP | 2-307114 A | 12/1990 |
| JP | 6-102995 A | 4/1994 |
| JP | 3040155 U | 5/1997 |
| JP | 2006-158862 A | 6/2006 |
| JP | 2007159801 A | 6/2007 |
| JP | 2009112406 A | 5/2009 |
| WO | 2008/156141 A1 | 12/2008 |

OTHER PUBLICATIONS

Japanese Office Action corresponding to Japanese Patent Application No. 2009-215558, dated Oct. 16, 2012.

English translation of International Preliminary Report on Patentability and Written Opinion corresponding to PCT/JP2010/052896, filed Feb. 24, 2010 and received May 1, 2012.

\* cited by examiner

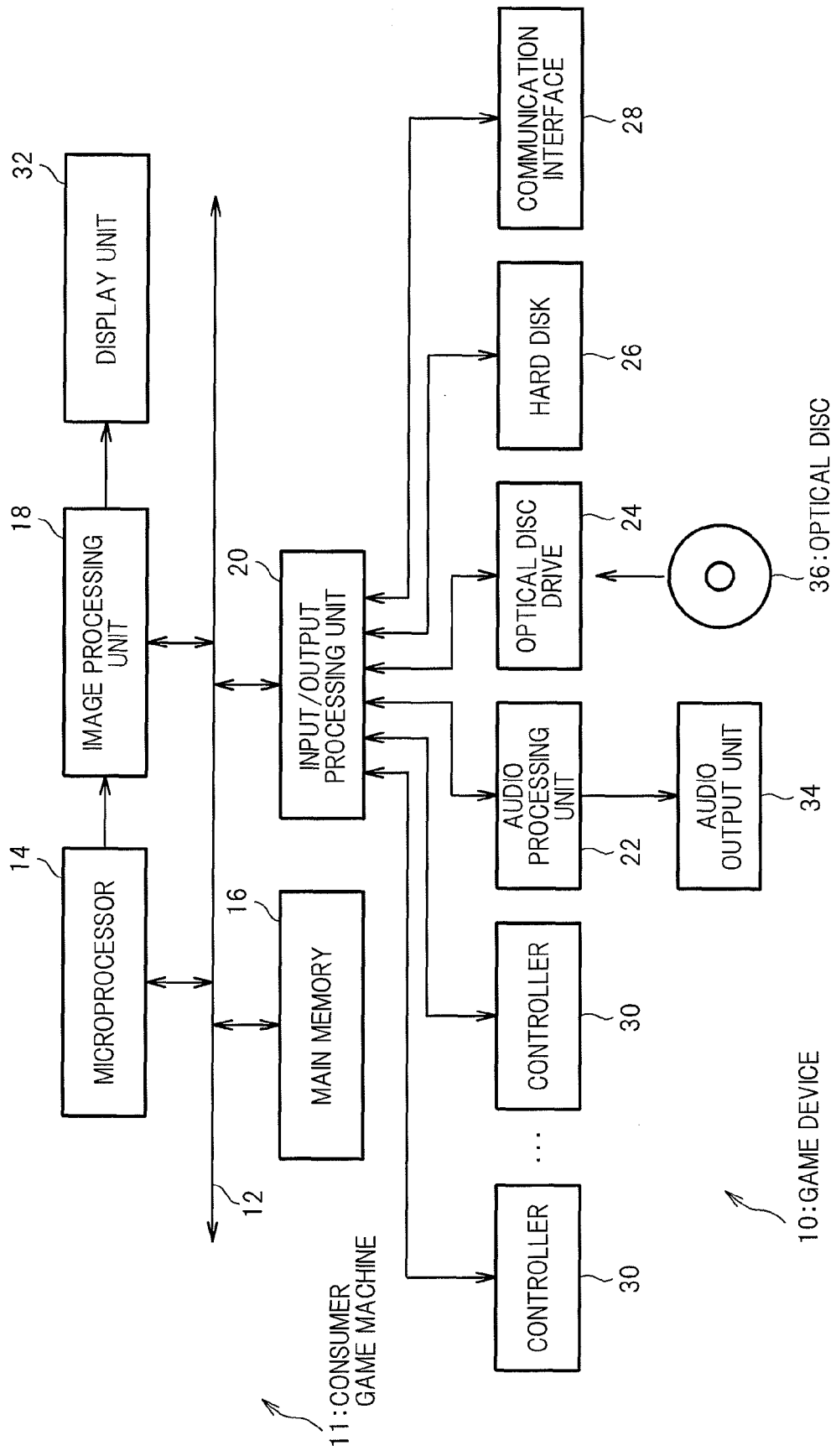

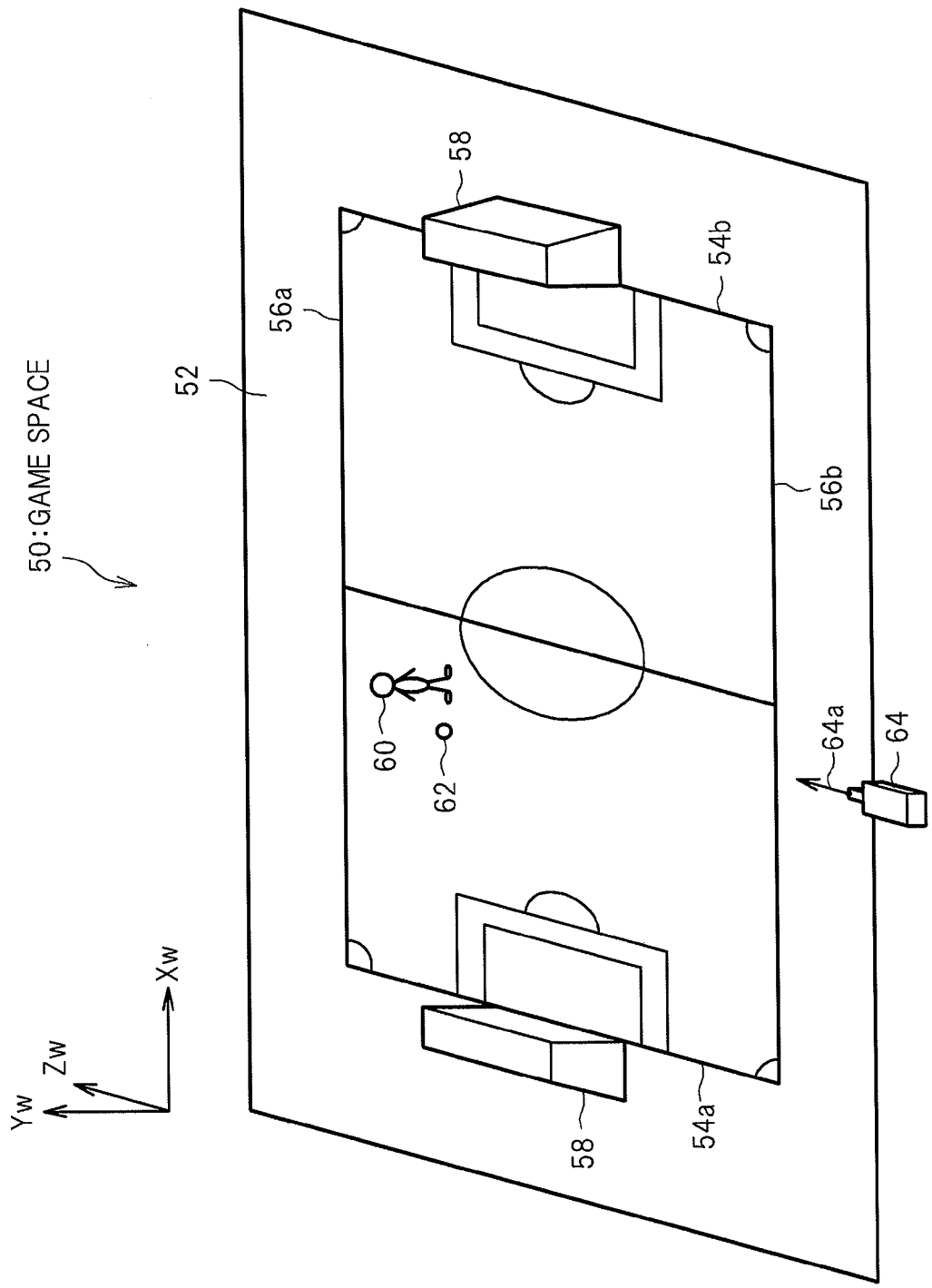

| PRESSING-FORCE VALUE (F) | MAGNITUDE OF BASIC DIRECTION VECTOR |
|---|---|
| F=0 | 0 |
| 0<F≦25 | 1 |
| 25<F≦50 | 2 |
| 50<F≦75 | 3 |
| 75<F≦100 | 4 |
| 100<F≦125 | 5 |
| 125<F≦150 | 6 |
| 150<F≦175 | 7 |
| 175<F≦200 | 8 |
| 200<F≦225 | 9 |
| F>225 | 10 |

| AREA | UPPER LIMIT MAGNITUDE OF BASIC DIRECTION VECTOR | | | |
|---|---|---|---|---|
| | UPWARD DIRECTION VECTOR | DOWNWARD DIRECTION VECTOR | LEFTWARD DIRECTION VECTOR | RIGHTWARD DIRECTION VECTOR |
| A1 | 2 | 10 | 2 | 10 |
| A2 | 2 | 10 | 10 | 10 |
| A3 | 2 | 10 | 10 | 2 |
| A4 | 10 | 2 | 2 | 10 |
| A5 | 10 | 2 | 10 | 10 |
| A6 | 10 | 2 | 10 | 2 |
| A7 | 10 | 10 | 2 | 10 |
| A8 | 10 | 10 | 10 | 2 |
| A9 | 10 | 10 | 10 | 10 |

FIG.13

| AREA | PRESSING-FORCE VALUE (F) | MAGNITUDE OF BASIC DIRECTION VECTOR | | | |
|---|---|---|---|---|---|
| | | UPWARD DIRECTION VECTOR | DOWNWARD DIRECTION VECTOR | LEFTWARD DIRECTION VECTOR | RIGHTWARD DIRECTION VECTOR |
| A1 | F=0 | 0 | 0 | 0 | 0 |
| | 0<F≦25 | 1 | 1 | 1 | 1 |
| | 25<F≦50 | 1 | 2 | 1 | 2 |
| | 50<F≦75 | 1 | 3 | 1 | 3 |
| | 75<F≦100 | 1 | 4 | 1 | 4 |
| | 100<F≦125 | 1 | 5 | 1 | 5 |
| | 125<F≦150 | 2 | 6 | 2 | 6 |
| | 150<F≦175 | 2 | 7 | 2 | 7 |
| | 175<F≦200 | 2 | 8 | 2 | 8 |
| | 200<F≦225 | 2 | 9 | 2 | 9 |
| | F>225 | 2 | 10 | 2 | 10 |
| A2 | F=0 | 0 | 0 | 0 | 0 |
| | 0<F≦25 | 1 | 1 | 1 | 1 |
| | 25<F≦50 | 1 | 2 | 2 | 2 |
| | 50<F≦75 | 1 | 3 | 3 | 3 |
| | 75<F≦100 | 1 | 4 | 4 | 4 |
| | 100<F≦125 | 1 | 5 | 5 | 5 |
| | 125<F≦150 | 2 | 6 | 6 | 6 |
| | 150<F≦175 | 2 | 7 | 7 | 7 |
| | 175<F≦200 | 2 | 8 | 8 | 8 |
| | 200<F≦225 | 2 | 9 | 9 | 9 |
| | F>225 | 2 | 10 | 10 | 10 |
| ... | ... | ... | ... | ... | ... |

FIG.14

| PARAMETER (P) | PRESSING-FORCE VALUE (F) | MAGNITUDE OF BASIC DIRECTION VECTOR |
|---|---|---|
| P<50 | F=0 | 0 |
| | 0<F≦50 | 2 |
| | 50<F≦100 | 4 |
| | 100<F≦150 | 6 |
| | 150<F≦200 | 8 |
| | F>200 | 10 |
| P≧50 | F=0 | 0 |
| | 0<F≦25 | 1 |
| | 25<F≦50 | 2 |
| | 50<F≦75 | 3 |
| | 75<F≦100 | 4 |
| | 100<F≦125 | 5 |
| | 125<F≦150 | 6 |
| | 150<F≦175 | 7 |
| | 175<F≦200 | 8 |
| | 200<F≦225 | 9 |
| | F>225 | 10 |

| RATIO (R) | ANGLE FROM FIRST BASIC DIRECTION (θ1) | ANGLE FROM SECOND BASIC DIRECTION (θ2) |
|---|---|---|
| 0<R≦0.2 | 81° | 9° |
| 0.2<R≦0.3 | 72° | 18° |
| 0.3<R≦0.4 | 63° | 27° |
| 0.4<R≦0.5 | 54° | 36° |
| 0.5<R≦0.6 | 45° | 45° |
| 0.6<R≦0.7 | 36° | 54° |
| 0.7<R≦0.8 | 27° | 63° |
| 0.8<R≦0.9 | 18° | 72° |
| 0.9<R<1.0 | 9° | 81° |

※R=(F1/(F1+F2))

| AREA | LOWER LIMIT OF ANGLE FROM BASIC DIRECTION | | | |
|---|---|---|---|---|
| | UPWARD DIRECTION | DOWNWARD DIRECTION | LEFTWARD DIRECTION | RIGHTWARD DIRECTION |
| A1 | 0° | 0° | 70° | 0° |
| A2 | 70° | 0° | 0° | 0° |
| A3 | 0° | 0° | 0° | 70° |
| A4 | 0° | 0° | 70° | 0° |
| A5 | 0° | 70° | 0° | 0° |
| A6 | 0° | 0° | 0° | 70° |
| A7 | 0° | 0° | 70° | 0° |
| A8 | 0° | 0° | 0° | 70° |
| A9 | 0° | 0° | 0° | 0° |

| PARAMETER (P) | RATIO (R) | ANGLE FROM FIRST BASIC DIRECTION (θ1) | ANGLE FROM SECOND BASIC DIRECTION (θ2) |
|---|---|---|---|
| P<50 | 0<R≦0.2 | 81° | 9° |
| | 0.2<R≦0.4 | 63° | 27° |
| | 0.4<R≦0.6 | 45° | 45° |
| | 0.6<R≦0.8 | 27° | 63° |
| | 0.8<R<1.0 | 9° | 81° |
| P≧50 | 0<R≦0.2 | 81° | 9° |
| | 0.2<R≦0.3 | 72° | 18° |
| | 0.3<R≦0.4 | 63° | 27° |
| | 0.4<R≦0.5 | 54° | 36° |
| | 0.5<R≦0.6 | 45° | 45° |
| | 0.6<R≦0.7 | 36° | 54° |
| | 0.7<R≦0.8 | 27° | 63° |
| | 0.8<R≦0.9 | 18° | 72° |
| | 0.9<R<1.0 | 9° | 81° |

| PARAMETER (P) | TILT DIRECTION ($\theta i$) | REPRESENTATIVE DIRECTION ($\theta o$) |
|---|---|---|
| P<50 | 0° ≦ $\theta i$ ≦30°<br>330° < $\theta i$ <360° | 0° |
|  | 30° < $\theta i$ ≦60° | 45° |
|  | 60° < $\theta i$ ≦120° | 90° |
|  | 120° < $\theta i$ ≦150° | 135° |
|  | 150° < $\theta i$ ≦210° | 180° |
|  | 210° < $\theta i$ ≦240° | 225° |
|  | 240° < $\theta i$ ≦300° | 270° |
|  | 300° < $\theta i$ ≦330° | 315° |
| P≧50 | 0° ≦ $\theta i$ ≦20°<br>340° < $\theta i$ <360° | 0° |
|  | 20° < $\theta i$ ≦45° | 32° |
|  | 45° < $\theta i$ ≦70° | 57° |
|  | 70° < $\theta i$ ≦110° | 90° |
|  | 110° < $\theta i$ ≦135° | 122° |
|  | 135° < $\theta i$ ≦160° | 147° |
|  | 160° < $\theta i$ ≦200° | 180° |
|  | 200° < $\theta i$ ≦225° | 212° |
|  | 225° < $\theta i$ ≦250° | 237° |
|  | 250° < $\theta i$ ≦290° | 270° |
|  | 290° < $\theta i$ ≦315° | 302° |
|  | 315° < $\theta i$ ≦340° | 327° |

INFORMATION PROCESSING DEVICE, METHOD FOR CONTROLLING INFORMATION PROCESSING DEVICE, PROGRAM, AND INFORMATION STORAGE MEDIUM

CROSS REFERENCE TO RELATED APPLICATIONS

This application is a National Stage of International Application No. PCT/JP2010/052896 filed on Feb. 24, 2010, which claims priority from Japanese Patent Application No. 2009-215558 filed Sep. 17, 2009, the contents of all of which are incorporated herein by reference in their entirety.

TECHNICAL FIELD

The present invention relates to an information processing device, a method of controlling the information processing device, a program, and an information storage medium.

BACKGROUND ART

There have been known information processing devices which include a plurality of depression units corresponding to a plurality of basic directions and allow a user to give a directional instruction by pressing at least one of the plurality of depression units. An example of these types of information processing devices is a game device equipped with a controller that includes four buttons corresponding to four directions, up, down, left, and right, or with a controller that includes a four-way navigation button.

PRIOR ART DOCUMENT

Patent Document

[Patent Document 1] JP 2006-158862 A

DISCLOSURE OF THE INVENTION

Problems to be Solved by the Invention

The information processing devices described above are relatively limited in terms of directions that the user can specify in instructions. For example, in a game device equipped with a controller that includes four buttons corresponding to four directions, up, down, left, and right, or with a controller that includes a four-way navigation button, directions that the user can specify in instructions are limited to eight directions spaced at 45-degree intervals (up, down, left, right, upper right, upper left, lower right, and lower left).

The present invention has been made in view of this problem, and an object of the present invention is therefore to provide an information processing device which includes a plurality of depression units corresponding to a plurality of basic directions and allows a user to give a directional instruction by pressing at least one of the plurality of depression units, and in which the number of direction options that the user can choose from can be increased. The present invention also provides a method of controlling the information processing device, a program, and an information storage medium.

Means for Solving the Problems

In order to solve the above-mentioned problem, according to the present invention, there is provided an information processing device, which includes a plurality of depression units corresponding to a plurality of basic directions and allows a user to give a directional instruction by pressing at least one of the plurality of depression units, the information processing device further including: direction obtaining means for obtaining a direction based on how the plurality of depression units are pressed; and processing executing means for executing processing based on the direction obtained by the direction obtaining means, in which the direction obtaining means includes: means for obtaining pressing-force information, which is about pressing forces that are applied respectively to the plurality of depression units; and means for obtaining, in a case where a first depression unit and a second depression unit are pressed, among the plurality of depression units, a direction between a first basic direction which corresponds to the first depression unit and a second basic direction which corresponds to the second depression unit, based on pressing forces that are applied respectively to the first depression unit and the second depression unit, and the direction obtained by the direction obtaining means in a case where the first depression unit and the second depression unit are pressed changes based on the pressing forces that are applied respectively to the first depression unit and the second depression unit.

Further, according to the present invention, there is provided a method of controlling an information processing device which includes a plurality of depression units corresponding to a plurality of basic directions and allows a user to give a directional instruction by pressing at least one of the plurality of depression units, the method including: a direction obtaining step of obtaining a direction based on how the plurality of depression units are pressed; and a processing executing step of executing processing based on the direction obtained in the direction obtaining step, in which the direction obtaining step includes the steps of: obtaining pressing-force information, which is about pressing forces that are applied respectively to the plurality of depression units; and obtaining, in a case where a first depression unit and a second depression unit are pressed, among the plurality of depression units, a direction between a first basic direction which corresponds to the first depression unit and a second basic direction which corresponds to the second depression unit, based on pressing forces that are applied respectively to the first depression unit and the second depression unit, and the direction obtained in the direction obtaining step in a case where the first depression unit and the second depression unit are pressed changes based on the pressing forces that are applied respectively to the first depression unit and the second depression unit.

Further, according to the present invention, there is provided a program for controlling a computer which includes a plurality of depression units corresponding to a plurality of basic directions to function as an information processing device which allows a user to give a directional instruction by pressing at least one of the plurality of depression units, the program further controlling the computer to function as: direction obtaining means for obtaining a direction based on how the plurality of depression units are pressed; and processing executing means for executing processing based on the direction obtained by the direction obtaining means, in which the direction obtaining means includes: means for obtaining pressing-force information, which is about pressing forces that are applied respectively to the plurality of depression units; and means for obtaining, in a case where a first depression unit and a second depression unit are pressed, among the plurality of depression units, a direction between a first basic direction which corresponds to the first depression unit and a second basic direction which corresponds to the second depression unit, based on pressing forces that are applied respectively to the first depression unit and the second depression unit, and the direction obtained by the direction obtaining means in a case where the first depression unit and the second depression unit are pressed changes based on the pressing forces that are applied respectively to the first depression unit and the second depression unit.

Further, an information storage medium according to the present invention is a computer-readable information storage medium on which the above-mentioned program is recorded.

According to the present invention, the number of direction options that a user can choose from is increased in an information processing device which includes a plurality of depression units corresponding to a plurality of basic directions and allows the user to give a directional instruction by pressing at least one of the plurality of depression units.

Further, according to one aspect of the present invention, when the first depression unit and the second depression unit are pressed, the direction obtaining means may obtain a direction represented by a combined vector which is a result of combining a first basic direction vector and a second basic direction vector, the first basic direction vector representing the first basic direction and having a magnitude corresponding to the pressing force that is applied to the first depression unit, the second basic direction vector representing the second basic direction and having a magnitude corresponding to the pressing force that is applied to the second depression unit.

Further, according to one aspect of the present invention, the processing executing means may include means for moving a moving-operation target based on the direction obtained by the direction obtaining means. The direction obtaining may include means for setting an upper limit or a lower limit to the magnitude of at least one of the first basic direction vector and the second basic direction vector based on a position of the moving-operation target.

Further, according to one aspect of the present invention, the processing executing means may include means for moving a moving-operation target based on the direction obtained by the direction obtaining UNIT. The direction obtaining means may include: means for obtaining a parameter of the moving-operation target, which is stored in parameter storing means; means for setting the magnitude of the first basic direction vector so as to change in stages in accordance with the pressing force that is applied to the first depression unit; means for setting the magnitude of the second basic direction vector so as to change in stages in accordance with the pressing force that is applied to the second depression unit; and means for setting a number of magnitude stages of at least one of the first basic direction vector and the second basic direction vector based on the parameter. The parameter may include at least one of a parameter related to an ability or performance of the moving-operation target and a parameter that increases or decreases as the moving-operation target moves or as time elapses.

Further, according to one aspect of the present invention, the processing executing means may include: means for moving a moving-operation target; means for setting a moving direction of the moving-operation target based on the direction obtained by the direction obtaining means; and means for setting a speed at which the moving-operation target moves based on a magnitude of the combined vector.

Further, according to one aspect of the present invention, the direction obtaining means may include: means for determining an angle from the first basic direction or from the second basic direction based on the pressing forces that are applied respectively to the first depression unit and the second depression unit; and means for obtaining the direction between the first basic direction and the second basic direction based on the determined angle.

Further, according to one aspect of the present invention, the processing executing means may include means for moving a moving-operation target based on the direction obtained by the direction obtaining means. The direction obtaining means may include means for setting an upper limit or a lower limit to the angle from the first basic direction or from the second basic direction based on a position of the moving-operation target.

Further, according to one aspect of the present invention, the processing executing means may include means for moving a moving-operation target based on the direction obtained by the direction obtaining UNIT. The direction obtaining means may include: means for obtaining a parameter of the moving-operation target which is stored in parameter storing means; means for determining the angle from the first basic direction or from the second basic direction so as to change in stages in accordance with the pressing forces that are applied respectively to the first depression unit and the second depression unit; and means for setting a number of stages of the angle from the first basic direction or from the second basic direction based on the parameter. The parameter may include at least one of a parameter related to an ability or performance of the moving-operation target and a parameter that increases or decreases as the moving-operation target moves or as time elapses.

BRIEF DESCRIPTION OF THE DRAWINGS

[FIG. 1] A diagram illustrating the hardware configuration of a game device (information processing device) according to embodiments of the present invention.

[FIG. 3] A diagram illustrating an example of a game space.

[FIG. 9] A diagram illustrating an example of upper limit data in Embodiment 1a.

[FIG. 10] A diagram illustrating areas in a pitch.

[FIG. 11] A diagram illustrating the function of a direction obtaining UNIT in Embodiment 1a.

[FIG. 12] A diagram illustrating an effect of Embodiment 1a.

[FIG. 13] A diagram illustrating an example of basic direction vector data in Embodiment 1a.

[FIG. 14] A diagram illustrating an example of basic direction vector data in Embodiment 1b.

[FIG. 17] A diagram illustrating an example of lower limit data in Embodiment 2a.

[FIG. 18] A diagram illustrating the function of a direction obtaining UNIT in Embodiment 2a.

[FIG. 19] A diagram illustrating an example of angle data in Embodiment 2b.

[FIG. 20] A diagram illustrating the function of a direction obtaining UNIT in Embodiment 3a.

[FIG. 22] A diagram illustrating an example of representative direction data in Embodiment 3c.

MODE FOR CARRYING OUT THE INVENTION

Figure 2A:
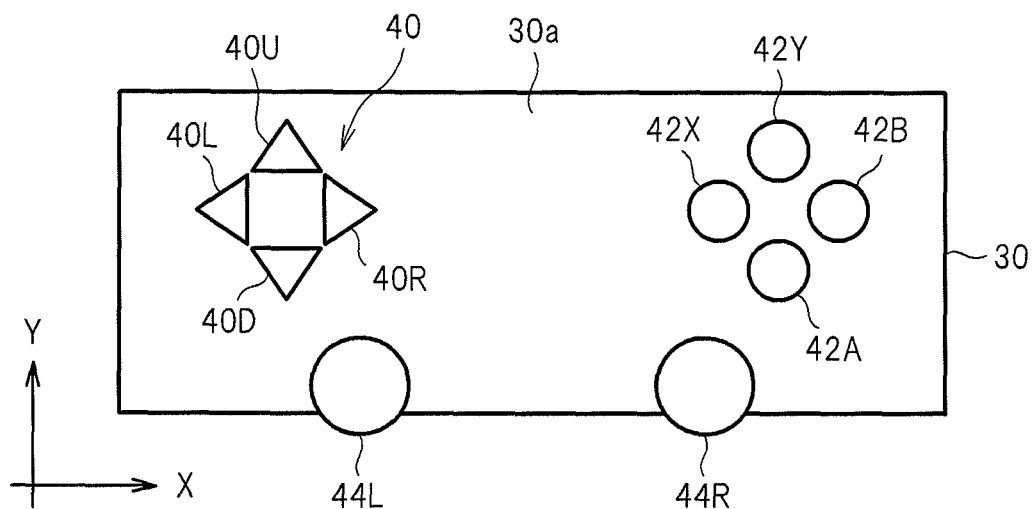
[FIG. 2A] A diagram illustrating an example of a controller.

Exemplary embodiments of the present invention are described in detail below with reference to the drawings. Described here is a case of applying the present invention to a game device, which is a form of information processing device. A game device (information processing device) according to the embodiments of the present invention is implemented by, for example, a consumer game machine (stationary game machine), a portable game machine, a mobile phone, a personal digital assistant (PDA), or a personal computer. The description given here is about the case where the game device according to the embodiments of the present invention is implemented by a consumer game machine.

[Embodiment 1]

FIG. 1 illustrates the hardware configuration of a game device according to Embodiment 1 of the present invention. A game device 10 illustrated in FIG. 1 includes a consumer game machine 11, a display unit 32, an audio output unit 34, and an optical disc 36 (information storage medium). The display unit 32 and the audio output unit 34 are connected to the consumer game machine 11. The display unit 32 can be, for example, a home-use television set or a liquid crystal display. The audio output unit 34 can be, for example, a speaker built into a home-use television set or headphones.

The consumer game machine 11 is a known computer game system. The consumer game machine 11 includes a bus 12, a microprocessor 14, a main memory 16, an image processing unit 18, an input/output processing unit 20, an audio processing unit 22, an optical disc drive 24, a hard disk 26, a communication interface 28, and a controller 30. Other components than the controller 30 are housed in a casing of the consumer game machine 11.

The microprocessor 14 executes information processing based on an operating system stored in a ROM (not shown) and a program read from the optical disc 36. The main memory 16 includes a RAM, for example, and programs and data read from the optical disc 36 are written into the main memory 16. The main memory 16 is also used as a working memory for the microprocessor 14. The bus 12 is used for communicating addresses and data among the units of the consumer game machine 11.

The image processing unit 18 includes a VRAM, and renders a game screen in the VRAM based on image data supplied from the microprocessor 14. The game screen rendered in the VRAM is converted into video signals, and the signals are then output to the display unit 32 at a predetermined timing.

The input/output processing unit 20 is an interface for the microprocessor 14 to access the audio processing unit 22, the optical disc drive 24, the hard disk 26, the communication interface 28, and the controller 30. The audio processing unit 22 includes a sound buffer, and outputs, from the audio output unit 34, audio data loaded from the optical disc 36 into the sound buffer. The communication interface 28 is an interface for connecting the consumer game machine 11 by wire or wireless to a communication network, such as the Internet.

The optical disc drive 24 reads programs and data recorded on the optical disc 36. In this specification, the optical disc 36 is used to supply programs and data to the consumer game machine 11, but another information storage medium, such as a memory card, may be used. Further, for example, programs and data may be supplied to the consumer game machine 11 from a remote location via a communication network. The hard disk 26 is a commonly-used hard disk device (auxiliary storage device). Note that the programs and data that are described as being stored in the optical disc 36 may be stored in the hard disk 26 instead.

Figure 2B:
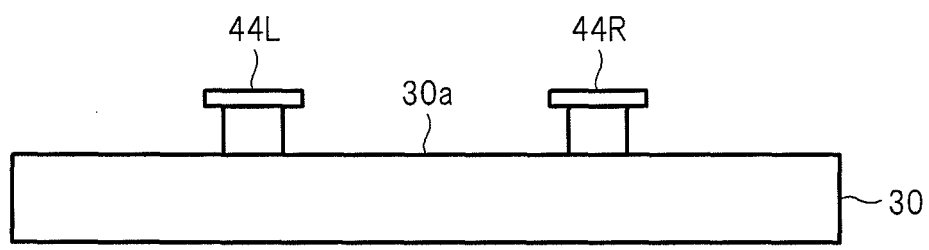
[FIG. 2B] A diagram illustrating the example of the controller.

The controller 30 is general-purpose operation means for receiving game operations. One or a plurality of the controllers 30 are connected to the consumer game machine 11 by wire or wireless. FIGS. 2A and 2B illustrate an example of the controller 30. Note that in FIG. 2A, an X-axis corresponds to a long-axis direction of the controller 30 (left-right direction), and a Y-axis corresponds to a short-axis direction of the controller 30 (up-down direction). The X-axis and the Y-axis are orthogonal to each other. Hereinafter, the positive Y-axis direction may be referred to as "upward direction" and the negative Y-axis direction as "downward direction". The positive X-axis direction may be referred to as "rightward direction" and the negative X-axis direction as "leftward direction".

There are disposed, on the surface 30a of the controller 30, a direction button group 40 and buttons 42A, 42B, 42X, and 42Y. Further, the controller 30 also includes sticks (levers) 44L and 44R. The direction button group 40 includes an up direction button 40U corresponding to an upward direction, a down direction button 40D corresponding to a downward direction, a left direction button 40L corresponding to a leftward direction, and a right direction button 40R corresponding to a rightward direction. The direction button group 40 is used for an operation of specifying a direction, for example.

The up direction button 40U is configured as a pressure-sensitive button. For example, a pressure-sensitive sensor is provided in the up direction button 40U to detect a pressing force applied to the up direction button 40U. Pressing-force information about the pressing force applied to the up direction button 40U is input to the consumer game machine 11. The pressing force applied to the up direction button 40U is expressed by, for example, a numerical value ranging from 0 to 255 (hereinafter, referred to as "pressing-force value"). The pressing-force value is larger in a case where the pressing force applied to the up direction button 40U is greater. A state in which the pressing-force value of the up direction button 40U is 0 is a state in which the up direction button 40U is not pressed.

The down direction button 40D, the left direction button 40L, and the right direction button 40R are configured as pressure-sensitive buttons similarly to the up direction button 40U, and pressing forces that are applied respectively to these buttons are also detected.

The sticks 44L and 44R stand erect on a front side 30a of a casing of the controller 30, and are configured to be tiltable in 360-degree directions by a given angle from the erect state. Tilt information about the tilt of the stick 44L in an up-down direction and a left-right direction is input to the consumer game machine 11.

For instance, a tilt in the left-right direction is expressed by, for example, a numerical value ranging from −127 to +127. A value "0" indicates that the stick 44L is not tilted in a left-right direction. A value "+127" indicates that the stick 44L is tilted in the rightward direction to the limit. A value "−127" indicates that the stick 44L is tilted in the leftward direction to the limit. The same applies to the up-down directions. The stick 44R is the same as the stick 44L.

The sticks 44L and 44R, too, are used in an operation, for example, for giving a directional instruction. The buttons 42A, 42B, 42X, and 42Y are used in various game operations. The buttons 42A, 42B, 42X, and 42Y are each configured as a pressure-sensitive button similarly to the direction button group 40, and pressing forces that are applied respectively to these buttons are detected.

The input/output processing unit 20 scans a state of each of the operation members of the controller 30 at fixed intervals (for example, every 1/60th of a second), and then supplies an operation signal representing scan results thus obtained to the microprocessor 14 via the bus 12. The pressing-force value of each of the up direction button 40U, the down direction button 40D, the left direction button 40L, and the right direction button 40R, and the tilt information of each of the sticks 44L and 44R are also supplied to the microprocessor 14 as the operation signal. Based on the operation signal, the microprocessor 14 determines a game operation performed by the user.

The game device 10 runs, for example, a soccer game by executing a game program read from the optical disc 36. In the soccer game, a match is held between a team operated by a user (hereinafter, referred to as "user team") and an opponent team.

In order to execute the soccer game, a game space is built in the main memory 16. FIG. 3 illustrates an example of the game space. A game space 50 illustrated in FIG. 3 is a virtual three-dimensional space in which three coordinate axes orthogonal to one another (Xw-axis, Yw-axis, and Zw-axis) are set. As illustrated in FIG. 3, a field 52 which is an object representing a soccer field is disposed in the game space 50. Goal lines 54a and 54b and touch lines 56a and 56b are shown on the field 52. An area enclosed by the goal lines 54a and 54b and the touch lines 56a and 56b is referred to as a "pitch".

Also disposed on the field 52 are goals 58, which are objects representing soccer goals, player characters 60, which are objects representing soccer players, and a ball 62, which is an object representing a soccer ball. The player characters 60 disposed on the field 52 include, although omitted from FIG. 3, eleven player characters 60 that belong to the user team and eleven player characters 60 that belong to the opponent team.

One of the goals 58 is associated with the user team and the other is associated with the opponent team. When the ball 62 moves into the goal 58 that is associated with one of the teams, a scoring event occurs for the other team.

A virtual camera 64 (point of view) is also set up in the game space 50. A game screen showing how the game space 50 looks through the virtual camera 64 is displayed on the display unit 32. In this embodiment, a sight line direction 64a of the virtual camera 64 is set such that a direction that is a projection of the sight line direction 64a onto the field 52 (an Xw-Zw plane) coincides with a positive Zw-axis direction. The virtual camera 64 moves parallel to an Xw-axis direction in the game space 50.

Figure 4:
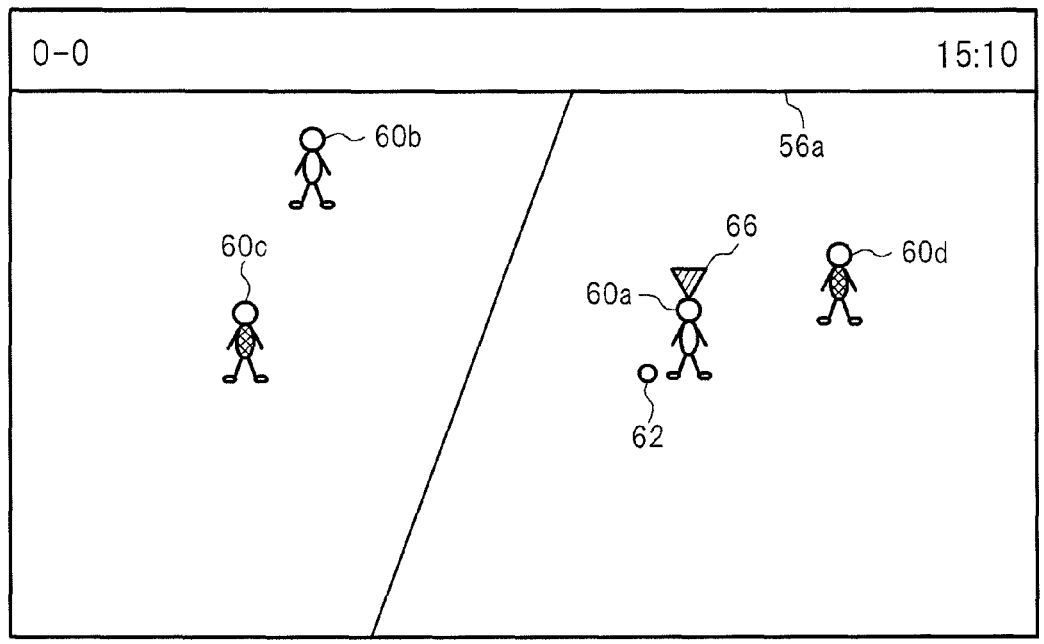
[FIG. 4] A diagram illustrating an example of a game screen.

FIG. 4 illustrates an example of the game screen. The game screen of FIG. 4 displays player characters 60a and 60b which belong to the user team and player characters 60c and 60d which belong to the opponent team.

One of the player characters 60 belonging to the user team is set as the user's operation target. The player character 60 that is the user's operation target acts based on the user's operation. On the game screen of FIG. 4, a triangular cursor 66 is displayed above the head of the player character 60a. The cursor 66 plays the role of showing which player character 60 is the user's operation target. In the following description, the player character 60 that is the user's operation target is referred to as "user character".

The user can move the user character by using the direction button group 40. In other words, the user character moves in a direction based on how buttons of the direction button group 40 are pressed. On the controller 30 in this embodiment, the upward direction (the positive Y-axis direction in FIG. 2A) corresponds to the positive Zw-axis direction and the downward direction (the negative Y-axis direction) corresponds to a negative Zw-axis direction. The leftward direction (the negative X-axis direction) and the rightward direction (the positive X-axis direction) on the controller 30 correspond to a negative Xw-axis direction and a positive Xw-axis direction, respectively.

Therefore, in a case where the up direction button 40U alone is pressed, for example, the user character moves in the positive Zw-axis direction. To give another example, in a case where the right direction button 40R alone is pressed, the user character moves in the positive Xw-axis direction. In the case where the user character is in possession of the ball 62, the moving action of the user character is a dribble action.

The user can also cause the user character to perform an action of kicking the ball 62 by using the direction button group 40 and the buttons 42A, 42B, 42X, and 42Y. For example, in a case where the button 42A is pressed while the user character is in possession of the ball 62, the user character performs a pass action. The pass direction (the direction in which the ball 62 kicked by the user character moves) in this case is set based on how the buttons of the direction button group 40 are pressed at the time the button 42A is pressed.

For example, in the case where the up direction button 40U alone is pressed at the time the button 42A is pressed, the user character performs a pass in the positive Zw-axis direction. In other words, the ball 62 kicked by the user character moves in the positive Zw-axis direction. To give another example, in the case where the right direction button 40R alone is pressed at the time the button 42A is pressed, the user character performs a pass in the positive Xw-axis direction.

Described below is a technology that enables the user to choose from more directions than the eight directions spaced at 45-degree intervals (up, down, left, right, upper right, upper left, lower right, and lower left directions) to specify as the moving direction of the user character (or of the ball 62 kicked by the user character) in the game device 10 described above.

Figure 5:
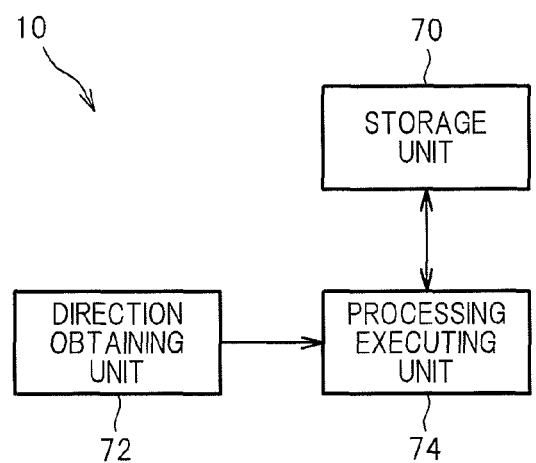
[FIG. 5] A functional block diagram of the game device according to the embodiments of the present invention.

FIG. 5 is a functional block diagram illustrating functions that are implemented by the game device 10. As illustrated in FIG. 5, the game device 10 includes a storage unit 70, a direction obtaining unit 72, and a processing executing unit 74. The storage unit 70 is implemented by, for example, the main memory 16, the hard disk 26, and/or the optical disc 36. The direction obtaining unit 72 and the processing executing unit 74 are implemented by the microprocessor 14 executing a program that is read from the optical disc 36.

The storage unit 70 stores various types of data. The storage unit 70 in this embodiment stores data about a soccer game.

For example, the storage unit 70 stores an ability parameter which indicates the ability of each player character 60. The ability parameter stored indicates, for example, a moving ability or a pass ability. The ability parameter takes a value of, for example, 0 to 100, and a higher ability is indicated by a higher ability parameter value.

The storage unit 70 also stores, for example, a fatigue level parameter which indicates the fatigue level of each player character 60. The fatigue level parameter, too, takes a value of 0 to 100, and a higher fatigue level is indicated by a higher fatigue level parameter value. For example, the initial value of the fatigue level parameter is set to 0 and the value of the fatigue level parameter increases with time. The value of the fatigue level parameter increases also when, for example, the player character 60 performs an action (for example, a moving action).

A stamina parameter indicating stamina may be stored instead of the fatigue level parameter. The stamina parameter, too, takes a value of 0 to 100 and greater stamina is indicated by a higher stamina parameter value. For example, the initial value of the stamina parameter is set to 100 and the value of the stamina parameter decreases with time. The value of the stamina parameter also decreases when, for example, the player character 60 performs an action (for example, a moving action).

The storage unit 70 also stores, for example, game situation data which indicates the current game situation. The game situation data includes, for example, the following data:

(a) state data of each player character 60;
(b) state data of the ball 62 (for example, the position, the moving direction, and the moving speed);
(c) state data of the virtual camera 64 (for example, the position, the sight line direction, and the angle of view);
(d) score data of both teams; and
(e) elapsed time data.

The state data of the player character 60 includes, for example, data that indicates the position, direction (posture), action type, moving direction, and moving speed of the player character 60. The state data of the player character 60 also includes, for example, data that indicates whether or not the player character 60 is set as the user's operation target and data that indicates whether or not the player character 60 is in possession of the ball 62.

The direction obtaining unit 72 obtains a direction based on how the plurality of depression units corresponding to a plurality of basic directions are pressed. In this embodiment, the up direction button 40U, the down direction button 40D, the left direction button 40L, and the right direction button 40R correspond to the "plurality of depression units". The "basic directions" and "directions" may be directions on the controller 30 (directions in the X-Y plane) or directions in the game space 50 (directions in the Xw-Zw plane).

A case in which the "basic directions" and "directions" are directions on the controller 30 is described below. In this case, the upward direction (the positive Y-axis direction in FIG. 2A), the downward direction (the negative Y-axis direction), the leftward direction (the negative X-axis direction), and the rightward direction (the positive X-axis direction) correspond to the "plurality of basic directions". In the case where the "basic directions" are directions in the game space 50, the positive and negative Xw-axis directions and the positive and negative Zw-axis directions correspond to the "plurality of basic directions".

The direction obtaining unit 72 obtains pressing-force information which is about pressing forces applied respectively to the plurality of depression units. The direction obtaining unit 72 in this embodiment obtains as the "pressing-force information" the respective pressing-force values of the up direction button 40U, the down direction button 40D, the left direction button 40L, and the right direction button 40R.

In the case where two of the plurality of depression units, for example, a first depression unit and a second depression unit, are pressed, the direction obtaining unit 72 obtains a direction between a first basic direction, which corresponds to the first depression unit, and a second basic direction, which corresponds to the second depression unit, based on pressing forces that are applied respectively to the first depression unit and the second depression unit. The direction obtained by the direction obtaining unit 72 changes in accordance with what pressing forces are applied respectively to the first depression unit and the second depression unit.

For instance, in a case where the first depression unit and the second depression unit are pressed, the direction obtaining unit 72 obtains a first basic direction vector which indicates the first basic direction corresponding to the first depression unit. The magnitude of the first basic direction vector is set to a magnitude that corresponds to the pressing force applied to the first depression unit. The direction obtaining unit 72 also obtains a second basic direction vector which indicates the second basic direction corresponding to the second depression unit. The magnitude of the second basic direction vector is set to a magnitude that corresponds to the pressing force applied to the second depression unit. The direction obtaining unit 72 then obtains a direction indicated by a combined vector that is the result of combining the first basic direction vector and the second basic direction vector.

Figures 6, 7:
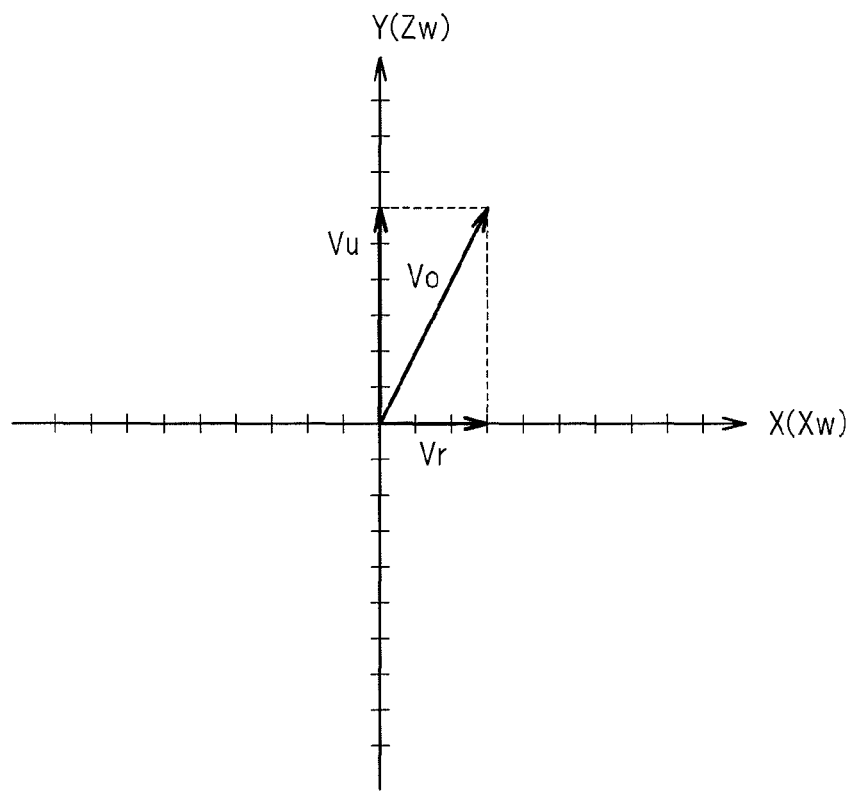
[FIG. 6] A diagram illustrating the function of a direction obtaining UNIT.
[FIG. 7] A diagram illustrating an example of basic direction vector data.

FIG. 6 is a diagram illustrating an example of the function of the direction obtaining unit 72. In this embodiment, the upward direction (the positive Y-axis direction in FIG. 2A) corresponds to the positive Zw-axis direction and the rightward direction (the positive X-axis direction) corresponds to the positive Xw-axis direction as described above. In FIG. 6, the X-axis (the Xw-axis) and the Y-axis (the Zw-axis) intersect at right angles, and the intersection between the X-axis and the Y-axis corresponds to the center of an area enclosed by the direction button group 40 on the controller 30.

A case in which the up direction button 40U (the first depression unit) and the right direction button 40R (the second depression unit) are pressed is discussed here. In a case where the up direction button 40U and the right direction button 40R are pressed, the direction obtaining unit 72 obtains, as illustrated in FIG. 6, an upward direction vector Vu (the first basic direction vector), which represents the upward direction (the first basic direction), and a rightward direction vector Vr (the second basic direction vector), which represents the rightward direction (the second basic direction). The magnitude of the upward direction vector Vu is set to a magnitude that corresponds to the pressing-force value of the up direction button 40U, and the magnitude of the rightward direction vector Vr is set to a magnitude that corresponds to the pressing-force value of the right direction button 40R.

The storage unit 70 in this embodiment stores data for setting the magnitudes of the first basic direction vector and the second basic direction vector to magnitudes that correspond to pressing forces. More specifically, basic direction vector data is stored which associates information about a pressing force with information about the magnitude of a basic direction vector. FIG. 7 is a diagram illustrating an example of the basic direction vector data. The basic direction vector data, which is table-format data in FIG. 7, may instead be formula-format data.

In the basic direction vector data of FIG. 7, the magnitude of a basic direction vector changes in stages in accordance with the pressing-force value. The magnitude of a basic direction vector is set to one of 0 to 10. In a case where a direction button is not pressed, in other words, in a case where the pressing-force value is 0, the magnitude of the basic direction vector is set to 0.

To give an example, in a case where the pressing-force value of the up direction button 40U is "150", the magnitude of the upward direction vector Vu is set to "6" according to the basic direction vector data of FIG. 7. To give another example, in a case where the pressing-force value of the right direction button 40R is "70", the magnitude of the rightward direction vector Vr is set to "3".

The direction obtaining unit 72 then obtains as illustrated in FIG. 6 a combined vector Vo, which is the result of combining the upward direction vector Vu and the rightward direction vector Vr, to obtain a direction represented by the combined vector Vo. In this embodiment, where the magnitudes of the upward direction vector Vu and the rightward direction vector Vr are changed by a change in pressing forces applied to the up direction button 40U and the right direction button 40R, the direction represented by the combined vector Vo is also changed by the change in pressing forces applied to the up direction button 40U and the right direction button 40R. The user can therefore change the direction represented by the combined vector Vo by adjusting pressing forces applied to the up direction button 40U and the right direction button 40R.

The obtaining of a direction by the direction obtaining unit 72 is executed the same way also in a case where, for example, the up direction button 40U and the left direction button 40L are pressed, in a case where the down direction button 40D and the left direction button 40L are pressed, or in a case where the down direction button 40D and the right direction button 40R are pressed.

The processing executing unit 74 executes processing based on a direction obtained by the direction obtaining unit 72. For example, the processing executing unit 74 moves a moving-operation target based on a direction obtained by the direction obtaining unit 72. In this embodiment, the user character is a "moving-operation target". The ball 62 kicked by the user character can also be a "moving-operation target".

Figure 8:
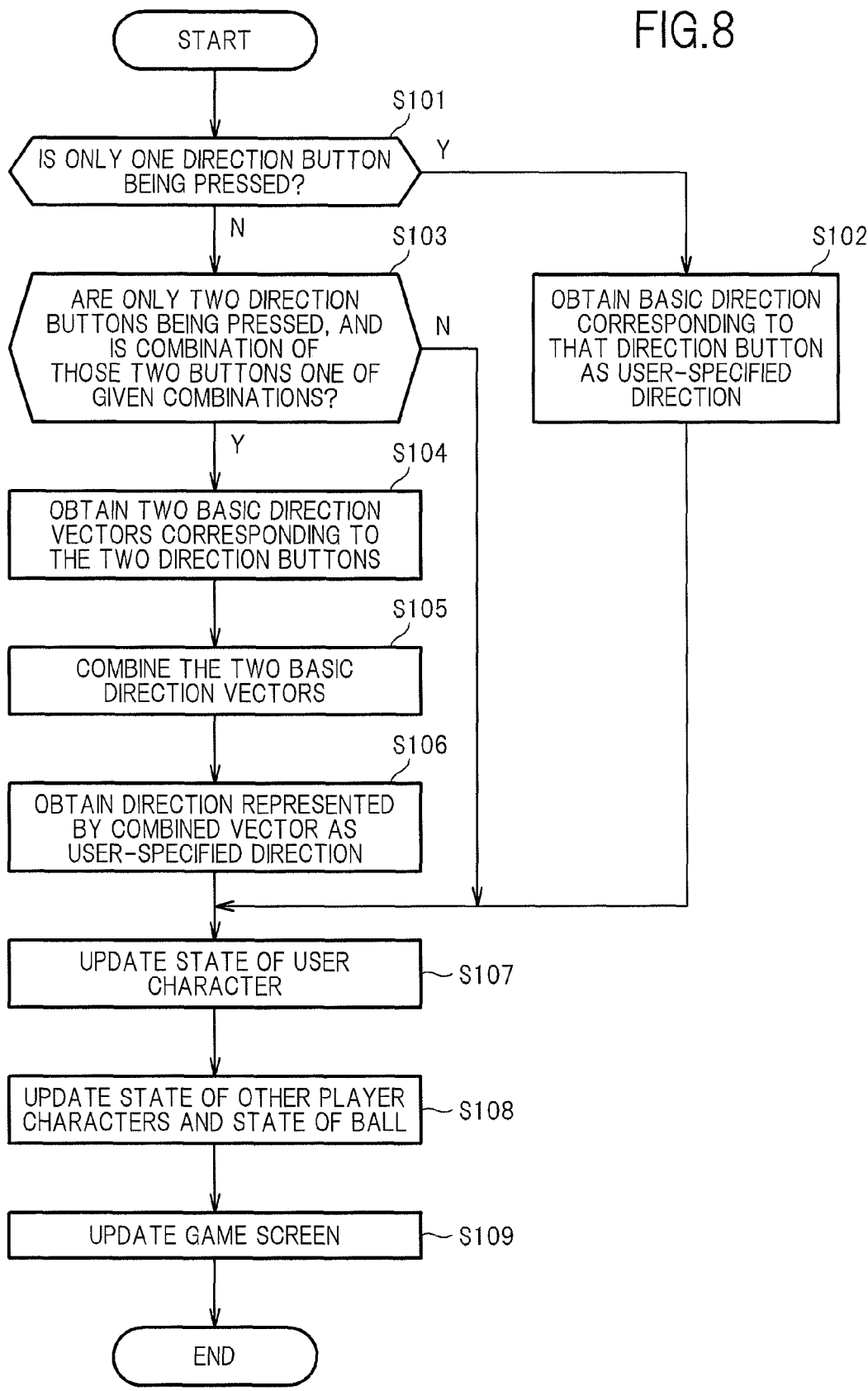
[FIG. 8] A flow chart illustrating an example of processing that is executed by the game device.

Processing executed by the game device 10 is described next. FIG. 8 is a flow chart illustrating mainly processing that is relevant to the present invention out of processing that the game device 10 executes at given time intervals (for example, every 1/60$^{th}$ of a second). The microprocessor 14 executes the processing of FIG. 8 by following the procedures of a program read from the optical disc 36. The direction obtaining unit 72 and the processing executing unit 74 are implemented through the execution of the processing of FIG. 8 by the microprocessor 14.

In the processing of FIG. 8, the microprocessor 14 first determines whether or not only one direction button of the direction button group 40 is pressed based on an operation signal supplied from the controller 30 (S101). In the case where only one direction button is pressed, the microprocessor 14 (the direction obtaining unit 72) obtains a basic direction that corresponds to this direction button as a direction specified by the user (S102). For example, in a case where the up direction button 40U alone is pressed, the upward direction which is the basic direction corresponding to the up direction button 40U is obtained as a direction specified by the user.

In the case where two or more direction buttons of the direction button group 40 are pressed, the microprocessor 14 determines whether or not only two direction buttons of the direction button group 40 are pressed and the combination of these two direction buttons is one of given combinations based on an operation signal supplied from the controller 30 (S103). The "given combinations" are combinations consisting of one of the up direction button 40U and the down direction button 40D and one of the left direction button 40L and the right direction button 40R.

In a case where only two direction buttons are pressed and the combination of these two direction buttons is one of the given combinations, the microprocessor 14 (the direction obtaining unit 72) obtains two basic direction vectors that correspond to these two direction buttons (S104).

For example, in a case where only the up direction button 40U and the right direction button 40R are pressed, the microprocessor 14 obtains the upward direction vector Vu (see FIG. 6) which represents the basic direction corresponding to the up direction button 40U and the rightward direction Vr (see FIG. 6) which represents the basic direction corresponding to the right direction button 40R. In this case, the magnitude of the upward direction vector Vu and the magnitude of the rightward direction vector Vr are respectively set to a magnitude that corresponds to the pressing-force value of the up direction button 40U and a magnitude that corresponds to the pressing-force value of the right direction button 40R, based on the basic direction vector data (see FIG. 7).

After that, the microprocessor 14 (the direction obtaining unit 72) combines the two basic direction vectors obtained in Step S104 (S105), and obtains a direction represented by the combined vector (for example, the combined vector Vo of FIG. 6) as direction specified by the user (S106).

After Steps S101 to S106 are executed, the microprocessor 14 (the processing executing unit 74) updates the state of the user character (S107). For instance, the microprocessor 14 sets the moving direction of the user character based on the user-specified direction obtained in Step S102 or S106, and updates the position of the user character based on the set moving direction. As a result, the user character moves in the direction specified by the user.

Note that, the microprocessor 14 (the processing executing unit 74) may set the speed at which the user character moves based on the magnitude of the combined vector obtained in Step S105. For example, the speed of the user character may be set such that the user character moves at a higher speed in a case where the magnitude of the combined vector is greater. This way, a user interface that enables the user to specify the speed of the user character by adjusting the force with which the buttons of the direction button group 40 are pressed is realized.

Further, in Step S107, the microprocessor 14 determines whether or not the user has pressed, for example, the button 42A. In the case where the user has pressed the button 42A, the microprocessor 14 causes the user character to perform a pass action. For instance, the state (for example, posture) of the user character is updated such that a pass action is performed.

The microprocessor 14 (the processing executing unit 74) then updates the state of player characters 60 other than the user character and the state of the ball 62 (S108). For instance, the state (the position and the like) of player characters 60 other than the user character which act under control of artificial intelligence (AI) is updated as instructed by AI.

The state (for example, the position, moving direction, and the like) of the ball 62 is also updated in Step S108 to move the ball 62 in a target direction in a case where, for example, any one of the player characters 60 kicks the ball 62. In the case where the ball 62 is kicked by the user character, in particular, the moving direction of the ball 62 is set based on the user-specified direction obtained in Step S102 or S106, and the position of the ball 62 is updated based on the set moving direction. As a result, the ball 62 kicked by the user character moves in the direction specified by the user.

The microprocessor 14 may set a speed at which the ball 62 moves in a case where it is kicked by the user character, based on the magnitude of the combined vector obtained in Step S105. For example, the speed of the ball 62 may be set such that the ball 62 moves at a higher speed as the magnitude of the combined vector is greater.

After that, the microprocessor 14 updates the game screen (S109). A game screen showing how the game space 50 looks through the virtual camera 64 is generated and displayed on the display unit 32. This processing is then ended.

According to the game device 10 described above, the user can choose from more directions than the eight directions spaced at 45-degree intervals (up, down, left, right, upper right, upper left, lower right, and lower left directions) to specify by adjusting forces with which the buttons of the direction button group 40 are pressed. For example, the user can specify one of more finely spaced directions between the upward direction and the rightward direction by adjusting forces with which the up direction button 40U and the right direction button 40R are pressed.

The game device 10 may be configured to specify the moving direction of the user character (or of the ball 62 kicked by the user character) with the use of the buttons 42A, 42B, 42X, and 42Y instead of the direction button group 40. For example, the button 42Y may be used as a button that corresponds to the upward direction in place of the up direction button 40U, and the button 42A is used as a button that corresponds to the downward direction in place of the down direction button 40D. Further, the button 42X may be used as a button that corresponds to the leftward direction in place of the left direction button 40L, and the button 42B may be used as a button that corresponds to the rightward direction in place of the right direction button 40R.

In a case where the button 42Y and the button 42B, for example, are pressed, a direction between the upward direction and the rightward direction is obtained based on the respective pressing-force values of the button 42Y and the button 42B.

[Embodiment 1a]

Embodiment 1 may be configured to make it difficult for a moving-operation target to go over a boundary line and move out of a given area. For example, the user character (or the ball 62) may be designed such that moving off the pitch is difficult for the user character (or the ball 62).

In a case where the first depression unit and the second depression unit are pressed, the direction obtaining unit 72 in Embodiment 1a sets an upper limit or a lower limit to the magnitude of at least one of the first basic direction vector, which corresponds to the first depression unit, and the second basic direction vector, which corresponds to the second depression unit, based on the position of the moving-operation target.

Figures 9, 10:
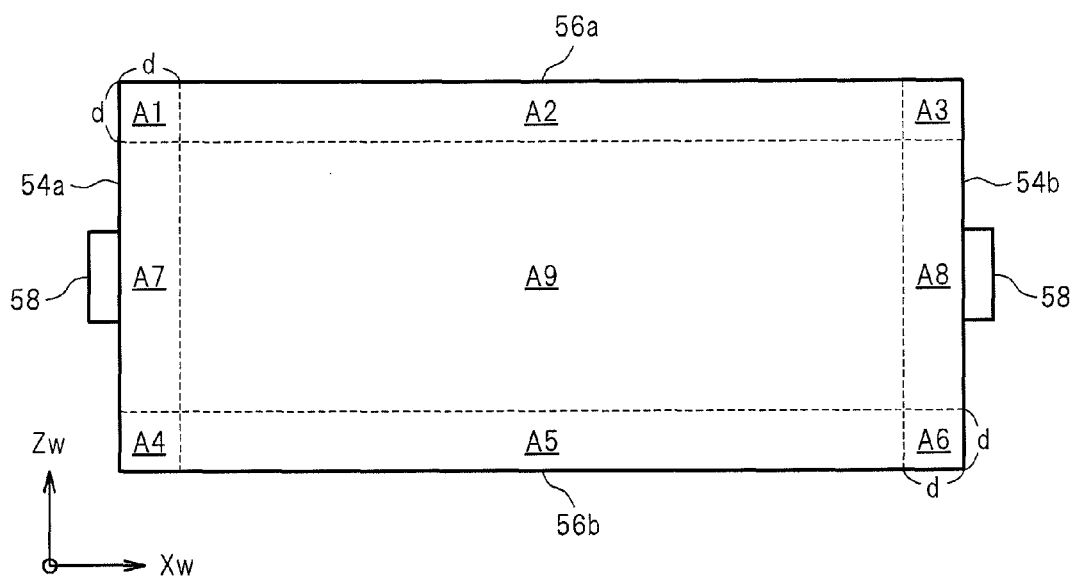

In Embodiment 1a, the storage unit 70 stores data for setting an upper limit or a lower limit to the magnitude of at least one of the first basic direction vector and the second basic direction vector based on the position of the moving-operation target. For example, the storage unit 70 stores data that associates information about the position of the user character (or the ball 62) with information about an upper limit or lower limit of the magnitude of a basic direction vector. FIG. 9 illustrates an example of upper limit data of the magnitudes of basic direction vectors. The upper limit data of FIG. 9 associates an area within the pitch with the upper limit magnitudes of basic direction vectors.

In FIG. 9, a basic direction vector that corresponds to the up direction button 40U and that represents the upward direction (the positive Y-axis direction) is written as an "upward direction vector". Similarly, a basic direction vector that corresponds to the down direction button 40D and that represents the downward direction (the negative Y-axis direction) is written as a "downward direction vector". A basic direction vector that corresponds to the left direction button 40L and that represents the leftward direction (the negative X-axis direction) is written as a "leftward direction vector". A basic direction vector that corresponds to the right direction button 40R and that represents the rightward direction (the positive X-axis direction) is written as a "rightward direction vector".

FIG. 10 is a diagram illustrating areas A1 to A9 within the pitch. As illustrated in FIG. 10, the areas A1, A2, and A3 are each an area at less than a reference distance d from the touch line 56a. The area A1 is an area at less than the reference distance d from the goal line 54a, and the area A3 is an area at less than the reference distance d from the goal line 54b. The area A2 is an area at the reference distance d or more from the goal lines 54a and 54b.

The areas A4, A5, and A6 are each an area at less than the reference distance d from the touch line 56b. The area A4 is an area at less than the reference distance d from the goal line 54a, and the area A5 is an area at less than the reference distance d from the goal line 54b. The area A6 is an area at the reference distance d or more from the goal lines 54a and 54b.

The areas A7, A8, and A9 are each an area at the reference distance d or more from the touch lines 56a and 56b. The area A7 is an area at less than the reference distance d from the goal line 54a, and the area A8 is an area at less than the reference distance d from the goal line 54b. The area A9 is an area at the reference distance d or more from the goal lines 54a and 54b.

The area A2, for example, adjoins the touch line 56a and, in a case where the user character (or the ball 62) positioned in the area A2 moves in the positive Zw-axis direction, the user character (or the ball 62) goes over the touch line 56a and moves off the pitch. In view of this, the upper limit data of FIG. 9 sets for the area A2 a value (2) smaller than a normal value (10) as the upper limit magnitude of the upward direction vector which is a basic direction vector corresponding to the positive Zw-axis direction, and sets the normal value (10) as the upper limit of other basic direction vectors. In other areas, too, the upper limits of basic direction vectors are set based on the same concept.

In Embodiment 1a, the upper limit magnitudes of two basic direction vectors obtained in Step S104 of FIG. 8 are set based on the upper limit data of FIG. 9.

Figure 11:
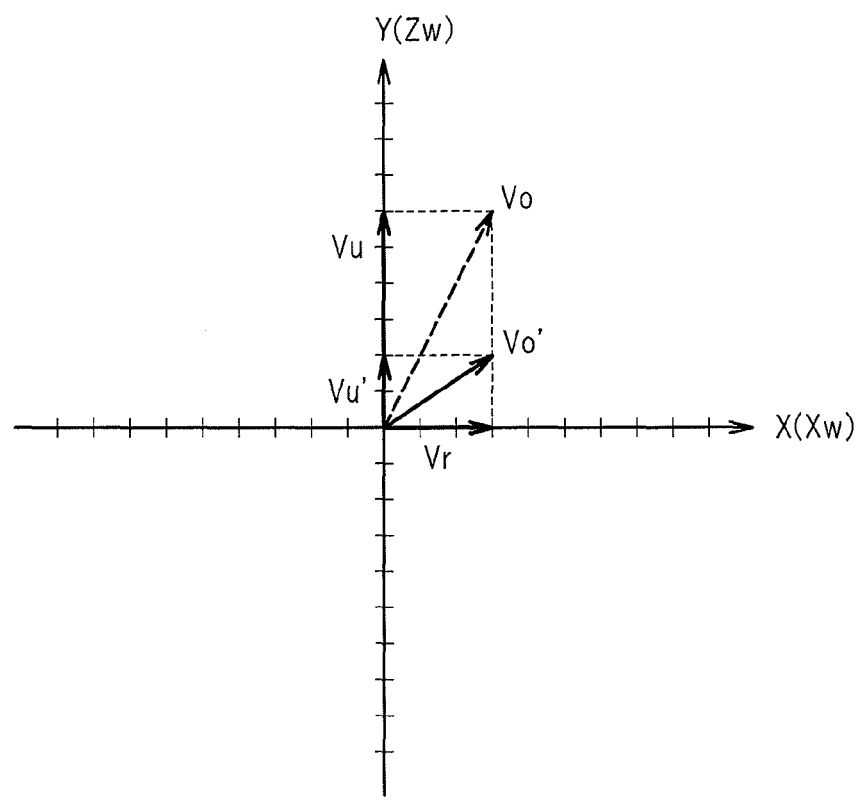

FIG. 11 is a diagram illustrating the function of the direction obtaining unit 72 in Embodiment 1a. A case in which the up direction button 40U and the right direction button 40R are pressed while the user character in possession of the ball 62 is positioned in the area A2 is discussed here as an example. The pressing-force value of the up direction button 40U is "150" and the pressing-force value of the right direction button 40R is "70" in this example.

In this case, according to the basic direction vector data of FIG. 7, "6" is obtained as the magnitude of the upward direction vector Vu corresponding to the up direction button 40U. According to the upper limit data of FIG. 9, however, the upper limit magnitude of the upward direction vector is "2" in a case where the user character (or the ball 62) is in the area A2, and the magnitude of the upward direction vector Vu is therefore modified to "2". In FIG. 11, an upward direction vector Vu' represents the modified upward direction vector.

As the magnitude of the rightward direction vector Vr corresponding to the right direction button 40R, on the other hand, "3" is obtained according to the basic direction vector data of FIG. 7. According to the upper limit data of FIG. 9, the upper limit magnitude of the rightward direction vector is "10" in a case where the user character (or the ball 62) is in the area A2, and the magnitude of the rightward direction vector Vr therefore remains "3".

In this case, a combined vector Vo' which is the result of combining the upward direction vector Vu' and the rightward direction vector Vr is obtained in Step S105, and the moving direction of the user character (or the ball 62 kicked by the user character) is set in Step S107 (or Step S108) based on a direction represented by the combined vector Vo'.

Figure 12:
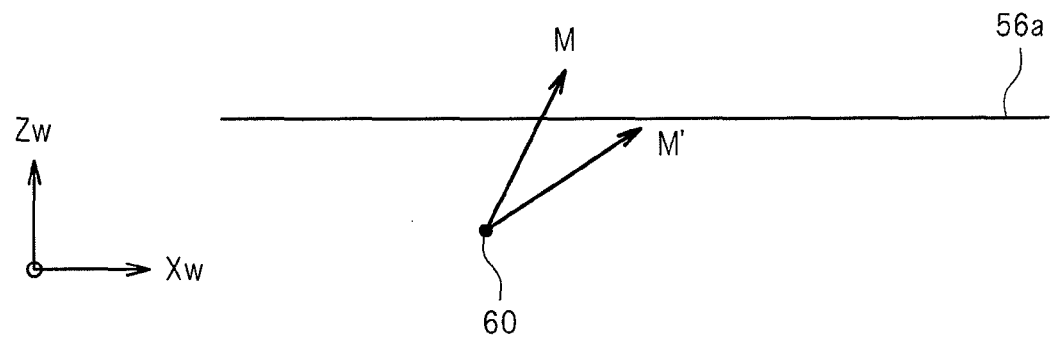

FIG. 12 is a diagram illustrating an effect of Embodiment 1a by comparing the case where the moving direction of the user character positioned in the area A2 is set based on the combined vector Vo' and the case where the moving direction of the user character in the area A2 is set based on the combined vector Vo, which is the result of combining the unchanged upward direction vector Vu and the rightward direction vector Vr. In FIG. 12, a moving direction M' is a moving direction that is set based on the combined vector Vo' and a moving direction M is a moving direction that is set based on the combined vector Vo. As illustrated in FIG. 12, it is harder for the user character to go over the touch line 56a and move off the pitch in a case where the user character moves in the moving direction M' than when the user character moves in the moving direction M.

As described, Embodiment 1a makes it difficult for the user character (or the ball 62) to move off the pitch, for example. This function (the function of making it difficult for the user character or the ball 62 to move off the pitch) is used as, for example, the function of assisting a beginner user in operating the controls. In other words, this function may be enabled only in a case where a beginner user operates the user team.

Data stored as the basic direction vector data in Embodiment 1a may be a combination of the basic direction vector data of FIG. 7 and the upper limit data of FIG. 9. FIG. 13 is a diagram illustrating an example of the basic direction vector data in this case. In the basic direction vector data of FIG. 13, an association relation between a pressing-force value and the magnitude of a basic direction vector is defined for each of the areas A1 to A9.

Embodiment 1a may also be configured such that lower limit data of the magnitudes of basic direction vectors is stored instead of the upper limit data of FIG. 9. In this case, for the area A2, for example, the lower limit magnitude of the upward direction vector which is a basic direction vector corresponding to the positive Zw-axis direction may be set to a normal value (0), and the lower limit magnitude of other basic direction vectors than the upward direction vector may be set to a value (9) larger than the normal value (0). In other areas, too, the lower limits of basic direction vectors are set based on the same concept. This also makes it difficult for the user character (or the ball 62) to move off the pitch.

[Embodiment 1b]

Embodiment 1 may be configured such that the user is made aware of the ability (or performance) of a moving-operation target. For example, the user may be made aware of the ability of the user character.

In Embodiment 1, the magnitudes of the first basic direction vector and the second basic direction vector change in stages in accordance with pressing forces that are applied respectively to the first depression unit and the second depression unit (see FIG. 7). The direction obtaining unit 72 in Embodiment 1b differs in this point and sets the number of magnitude stages of at least one of the first basic direction vector and the second basic direction vector based on a parameter of a moving-operation target.

The parameter of a moving-operation target is, for example, a parameter related to the ability (performance) of the user character, more specifically, a parameter related to a moving ability or a pass ability.

The basic direction vector data stored in Embodiment 1b is, for example, as illustrated in FIG. 14. The basic direction vector data of FIG. 14 defines an association relation between a pressing force and the magnitude of a basic direction vector for each parameter range of the user character.

In the basic direction vector data of FIG. 14, the number of magnitude stages of a basic direction vector is eleven (0 to 10) in a case where the parameter value of the user character is equal to or more than a reference value (50). In a case where the parameter value of the user character is less than the reference value (50), on the other hand, the number of magnitude stages of a basic direction vector is six (0, 2, 4, 6, 8, and 10). In short, the number of magnitude stages of a basic direction vector is smaller in the case where the parameter value of the user character is less than the reference value (50) than in the case where the parameter value of the user character is equal to or more than the reference value (50).

In Embodiment 1b, the magnitudes of two basic direction vectors are set in Step S104 of FIG. 8 based on the parameter of the user character, the pressing-force values of the two direction buttons, and the basic direction vector data of FIG. 14.

A case in which the up direction button 40U and the right direction button 40R are pressed is discussed here. The pressing-force value of the up direction button 40U is "150" and the pressing-force value of the right direction button 40R is "70" in this example.

In this case, the magnitude of the upward direction vector is set to "6" and the magnitude of the rightward direction vector is set to "3" in a case where the user character has a parameter value equal to or more than the reference value (50). In the case where the user character has a parameter value of less than the reference value (50), on the other hand, the magnitude of the upward direction vector is set to "6" and the magnitude of the rightward direction vector is set to "4". The thus set upward direction vector and rightward direction vector are combined in Step S105 of FIG. 8, and the moving direction of the user character (or the ball 62 kicked by the user character) is set in Step S107 (or Step S108) based on a direction represented by the combined vector.

According to Embodiment 1b, a user interface that makes the user aware of the ability of the user character is realized. The direction represented by a combined vector which is obtained in Step S106 changes more minutely in accordance with pressing forces that are applied to the buttons of the direction button group 40 as the number of magnitude stages of a basic direction vector is made larger. In other words, the user can specify one of more finely spaced directions as the moving direction of the user character (or the moving direction of the ball 62 kicked by the user character) as the number of magnitude stages of a basic direction vector is made larger.

Therefore, according to Embodiment 1b, the user can or cannot specify one of finely spaced directions as the moving direction of the user character (or the moving direction of the ball 62 kicked by the user character) depending on the ability of the user character. A user interface that makes the user aware of the ability of the user character is realized as a result.

The parameter of the user character may instead be a fatigue level parameter (or a stamina parameter). In this case, the basic direction vector of FIG. 14 is set such that the number of magnitude stages of a basic direction vector is smaller in a case where the fatigue level of the user character is higher (or in a case where the stamina of the user character is lower).

This way, the user can or cannot specify one of finely spaced directions as the moving direction of the user character (or the moving direction of the ball 62 kicked by the user character) depending on the fatigue level (or stamina) of the user character. A user interface that makes the user aware of the fatigue level (stamina) of the user character is realized as a result.

[Embodiment 2]

Embodiment 2 is characterized in that, in the case where the first depression unit and the second depression unit are pressed, an angle from the first basic direction corresponding to the first depression unit (or from the second basic direction corresponding to the second depression unit) is determined based on pressing forces that are applied respectively to the first depression unit and the second depression unit, to thereby obtain a direction between the first basic direction and the second basic direction.

The game device 10 according to Embodiment 2 has the same hardware configuration as that of Embodiment 1 (see FIGS. 1, 2A, and 2B). In Embodiment 2, a soccer game, for example, is run as in Embodiment 1. In other words, the same game space 50 (see FIG. 3) as that of Embodiment 1 is built and the same game screen (see FIG. 4) as that of Embodiment 1 is displayed.

The game device 10 according to Embodiment 2 also includes the same function blocks as those in Embodiment 1 (see FIG. 5). However, the function of the direction obtaining unit 72 in Embodiment 2 differs from the one in Embodiment 2 in some points. The function of the direction obtaining unit 72 is therefore described below.

In the case where the first depression unit and the second depression unit are pressed, the direction obtaining unit 72 in Embodiment 2 determines an angle from the first basic direction or from the second basic direction based on pressing forces that are applied respectively to the first depression unit and the second depression unit, and obtains a direction between the first basic direction and the second basic direction based on the determined angle.

Figures 15, 16:
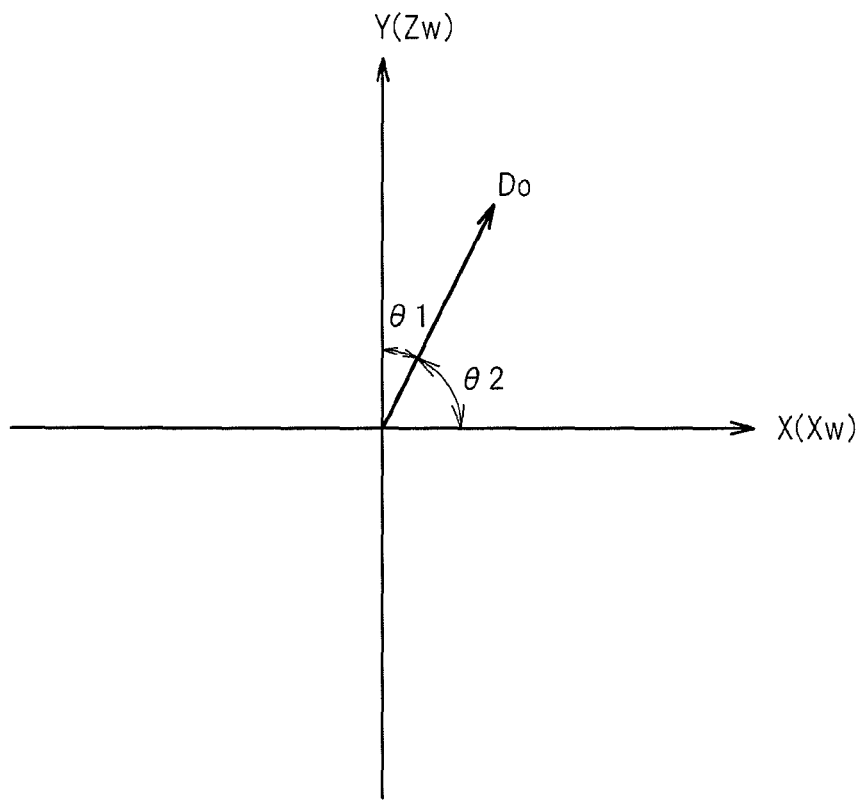
[FIG. 15] A diagram illustrating the function of a direction obtaining UNIT in Embodiment 2.
[FIG. 16] A diagram illustrating an example of angle data in Embodiment 2.

FIG. 15 is a diagram illustrating the function of the direction obtaining unit 72 in Embodiment 2. A case in which the up direction button 40U (the first depression unit) and the right direction button 40R (the second depression unit) are pressed is discussed here. In a case where the up direction button 40U and the right direction button 40R are pressed, an angle θ1 from a basic direction corresponding to the up direction button 40U (the upward direction) and an angle θ2 from a basic direction corresponding to the right direction button 40R (the rightward direction) are determined based on the respective pressing-force values of the up direction button 40U and the right direction button 40R as illustrated in FIG. 15. A direction Do which makes the angles θ1 and θ2 the determined angles is then obtained.

In Embodiment 2, the storage unit 70 stores data for determining an angle from the first basic direction or from the second basic direction based on pressing forces that are applied respectively to the first depression unit and the second depression unit. For example, the storage unit 70 stores angle data as the one illustrated in FIG. 16. In FIG. 16, "R" represents the ratio of the pressing-force value of the first depression unit (F1) to the sum of the pressing-force value of the first depression unit (F1) and the pressing-force value of the second depression unit (F2).

The angle data of FIG. 16 associates information about pressing forces that are applied respectively to the first depression unit and the second depression unit with information about an angle from the first basic direction or from the second basic direction. The "information about the angle from the first basic direction or from the second basic direction" can be paraphrased as information about a direction between the first basic direction and the second basic direction because a direction between the first basic direction and the second basic direction is identified by the angle from the first basic direction or from the second basic direction. In the angle data of FIG. 16, the angle from the first basic direction (θ1) is smaller in a case where the ratio of the pressing-force value of the first depression unit (R) is larger (that is, in a case where the pressing force applied to the first depression unit is larger).

The angle data of FIG. 16 is only for the cases where the combination of the first depression unit and the second depression unit is a combination of a) one of the up direction button 40U and the down direction button 40D and b) one of the left direction button 40L and the right direction button 40R. In these cases, the angle between the first basic direction and the second basic direction is 90° and the sum of the angles θ1 and θ2 is therefore 90°. Because knowing one of the angles θ1 and θ2 means that the other is known as well, the angle data of FIG. 16 may omit one of the angles θ1 and θ2.

For instance, in the case where the up direction button 40U (the first depression unit) and the right direction button 40R (the second depression unit) are pressed, the direction obtaining unit 72 obtains a direction between the upward direction (the first basic direction) and the rightward direction (the second basic direction) based on the respective pressing-force values of the up direction button 40 and the right direction button 40R and on the angle data of FIG. 16. In other words, the direction obtaining unit 72 obtains the angle θ1 from the upward direction (the first basic direction) and the angle θ2 from the rightward direction (the second basic direction) based on the respective pressing-force values of the up direction button 40 and the right direction button 40R and on the angle data of FIG. 16.

In a case where the pressing-force value of the up direction button 40U (F1) is "150" and the pressing-force value of the right direction button 40R (F2) is "70", for example, the ratio of the pressing-force value of the up direction button 40U (R) is "0.68". The direction obtaining unit 72 accordingly obtains "36°" as the angle θ1 from the upward direction and "54°" as the angle θ2 from the rightward direction. The direction obtaining unit 72 then obtains the direction Do whose angle θ1 from the upward direction is "36°" and whose angle θ2 from the rightward direction is "54°".

The angle data, which is a table-format data in FIG. 16, may not be table-format data and may instead be, for example, mathematical expression data. For instance, the angles θ1 and θ2 may be calculated by Expressions (1) to (3) given below. In the following Expressions (2) and (3), "90°" is the angle between the first basic direction and the second basic direction.

$$R = F1/(F1+F2) \quad (1)$$

$$\theta 1 = 90°*(1-R) \quad (2)$$

$$\theta 2 = 90° - \theta 1 \quad (3)$$

In the above Expressions (1) to (3), the angle from the first basic direction (θ1) is smaller in a case where the pressing-force value of the first depression unit (F1) is larger compared to the pressing-force value of the second depression unit (F2).

Embodiment 2, also, allows the user to choose from more directions than the eight directions spaced at 45-degree intervals (up, down, left, right, upper right, upper left, lower right, and lower left directions) to specify in an instruction by adjusting forces with which the buttons of the direction button group 40 are pressed. For instance, the user can specify one of more finely spaced directions between the upward direction and the rightward direction by adjusting forces with which the up direction button 40U and the right direction button 40R are respectively pressed.

[Embodiment 2a]

Embodiment 2 may be configured, as in Embodiment 1a, to make it difficult for a moving-operation target to go over a boundary line and move out of a given area. For example, the user character (or the ball 62) may be designed such that moving off the pitch is difficult for the user character (or the ball 62).

In the case where the first depression unit and the second depression unit are pressed, the direction obtaining unit 72 in Embodiment 2a sets an upper limit or a lower limit to the angle from the first basic direction corresponding to the first depression unit (or the second basic direction corresponding to the second depression unit), based on the position of the moving-operation target.

Figures 17, 18:
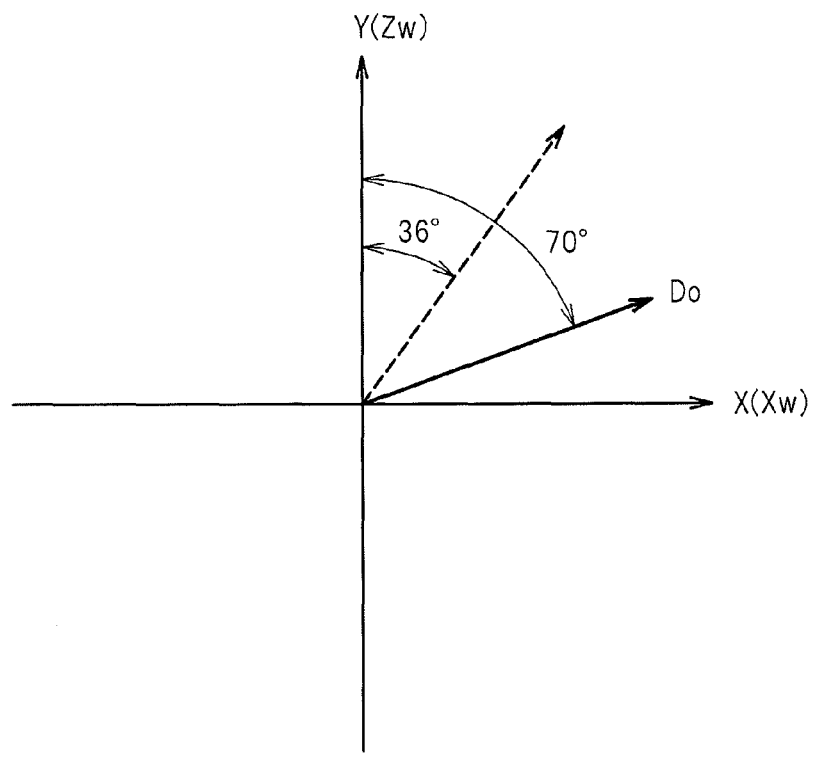

In Embodiment 2a, the storage unit 70 stores data for setting an upper limit or a lower limit to the angle from the first basic direction or from the second basic direction based on the position of the moving-operation target. The stored data is, for example, data that associates information about the position of the user character (or the ball 62) with information about the upper limit or lower limit of the angle from a basic direction. FIG. 17 illustrates an example of lower limit data of the angle from a basic direction. The lower limit data of FIG. 17 is data that associates the areas A1 to A9 (see FIG. 10) in the pitch with lower limits of the angle from a basic direction.

The area A2, for example, adjoins the touch line 56a and, in a case where the user character (or the ball 62) positioned in the area A2 moves in the positive Zw-axis direction, the user character (or the ball 62) goes over the touch line 56a and moves off the pitch. In view of this, the lower limit data of FIG. 17 sets, for the area A2, a value (70°) larger than a normal value (0°) as the lower limit angle from the upward direction which is a basic direction corresponding to the positive Zw-axis direction, and sets the normal value (0°) as the lower limit of angles from other basic directions. In other areas, also, the lower limits of angles from basic directions are set based on the same concept.

The area A1, for example, adjoins both the goal line 54a and the touch line 56a. For this or a similar area, the focus is on the goal line 54a in setting a lower limit to the angle from a basic direction. To elaborate, in a case where the user character (or the ball 62) positioned in the area A1 moves in the negative Xw-axis direction, the user character (or the ball 62) goes over the goal line 54a and moves off the pitch. In view of this, the lower limit data of FIG. 17 sets, for the area A1, a value (70°) larger than a normal value (0°) to the lower limit of the angle from the leftward direction which is a basic direction corresponding to the negative Xw-axis direction, and sets the normal value (0°) to the lower limit of the angles from other basic directions.

FIG. 18 is a diagram illustrating the function of the direction obtaining unit 72 in Embodiment 2a. A case in which the up direction button 40U and the right direction button 40R are pressed while the user character in possession of the ball 62 is positioned in the area A2 is discussed here as an example. The pressing-force value of the up direction button 40U is "150" and the pressing-force value of the right direction button 40R is "70" in this example.

In this case, the angle data of FIG. 16, for example, is referred to and "36°" is obtained as the angle θ1 from the basic direction that corresponds to the up direction button 40U (the upward direction). According to the lower limit data of FIG. 17, however, the lower limit of the angle from the upward direction is "70°" in the case where the user character (or the ball 62) is in the area A2, and the angle θ1 from the upward direction is therefore modified to "70°". The angle θ2 from the basic direction that corresponds to the right direction button 40R (the rightward direction) is also calculated by the above Expression (3) as "20°". The direction Do whose angle from the upward direction is "70°" and whose angle from the rightward direction is "20°" is then obtained.

This makes it difficult for the user character (or the ball 62) to move off the pitch as in Embodiment 1a (see FIG. 12).

[Embodiment 2b]

Embodiment 2 may be configured, as in Embodiment 1b, such that the user is made aware of the ability (or performance) of a moving-operation target. For example, the user may be made aware of the ability of the user character.

In Embodiment 2, the angle from the first basic direction or from the second basic direction changes in stages in accordance with pressing forces that are applied respectively to the first depression unit and the second depression unit (see FIG. 16). The direction obtaining unit 72 in Embodiment 2b differs in this point and sets the number of stages of the angle from the first basic direction or from the second basic direction based on a parameter of a moving-operation target.

The parameter of a moving-operation target is, for example, a parameter related to the ability (performance) of the user character, more specifically, a parameter related to a moving ability or a pass ability.

Figures 19, 20:
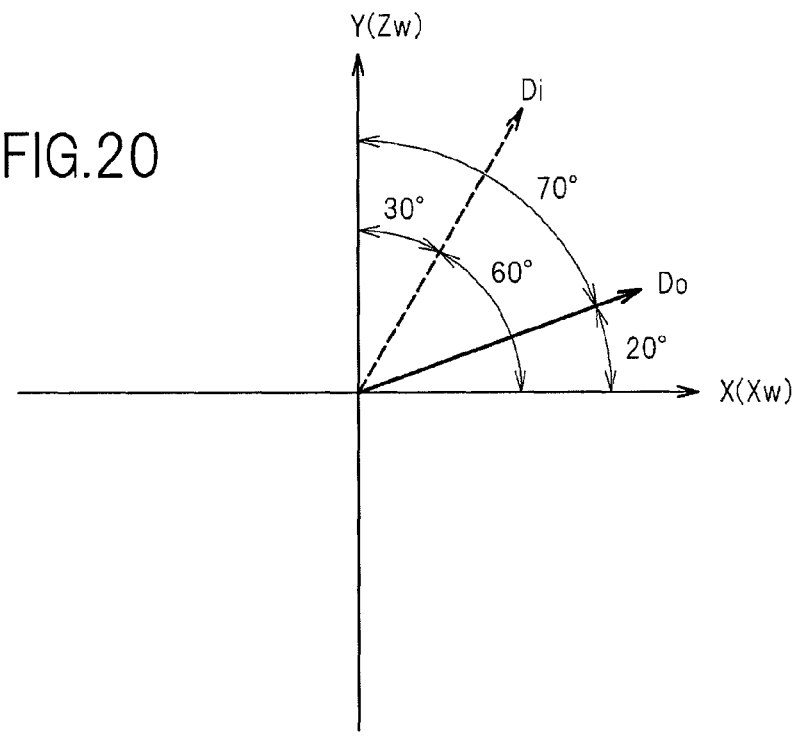

The angle data stored in the storage unit 70 in Embodiment 2b is, for example, as illustrated in FIG. 19. The angle data of FIG. 19 defines an association relation between a pressing-force value and the angle from the first basic direction or from the second basic direction for each parameter range of the user character.

In the angle data of FIG. 19, in the case where the parameter (for example, moving ability parameter) of the user character has a value equal to or more than a reference value (50), the angles θ1 and θ2 change in nine stages. In the case where the parameter value of the user character is less than the reference value (50), on the other hand, the angles θ1 and θ2 change in five stages. In short, the number of stages of the angles θ1 and θ2 is smaller in the case where the parameter value of the user character is less than the reference value (50) than when the parameter value of the user character is equal to or more than the reference value (50).

In Embodiment 2b, in the case where the first depression unit and the second depression unit are pressed, the angle from the first basic direction or from the second basic direction is determined based on the parameter of the user character, the respective pressing-force values of the first depression unit and the second depression unit, and the angle data of FIG. 19.

A case in which the up direction button 40U and the right direction button 40R are pressed is discussed here. The pressing-force value of the up direction button 40U is "150" and the pressing-force value of the right direction button 40R is "70" in this example.

In this case, in the case where the parameter value of the user character is equal to or more than the reference value (50), the angle θ1 from the basic direction that corresponds to the up direction button 40U (the upward direction) is determined as "36°" and the angle θ2 from the basic direction that corresponds to the right direction button 40R (the rightward direction) is determined as "54°". In the case where the parameter value of the user character is less than the reference value (50), on the other hand, the angle θ1 from the basic direction that corresponds to the up direction button 40U (the upward direction) is determined as "27°" and the angle θ2 from the basic direction that corresponds to the right direction button 40R (the rightward direction) is determined as "63°". The direction Do whose angle θ1 from the upward direction and angle θ2 from the rightward direction are the determined angles is then obtained (see FIG. 15), and the moving direction of the user character (or the ball 62 kicked by the user character) is set based on the obtained direction.

According to Embodiment 2b, as in Embodiment 1b, a user interface that makes the user aware of the ability of the user character is realized. The direction obtained by the direction obtaining unit 72 changes more minutely in accordance with pressing forces that are applied to the buttons of the direction button group 40 as the number of stages of the angles θ1 and θ2 is made larger. In other words, the user can specify one of more finely spaced directions as the moving direction of the user character (or the moving direction of the ball 62 when the ball 62 is passed) as the number of stages of the angles θ1 and θ2 is made larger.

Therefore, according to Embodiment 2b, the user can or cannot specify one of finely spaced directions as the moving direction of the user character (or the moving direction of the ball 62 kicked by the user character) depending on the ability (performance) of the user character. According to Embodiment 2b, a user interface that makes the user aware of the ability (performance) of the user character is realized.

The parameter of the user character may instead be a fatigue level parameter (or a stamina parameter). In this case, the angle data of FIG. 19 is set such that the number of stages of the angles θ1 and θ2 is smaller in the case where the fatigue level of the user character is high (or in the case where the stamina of the user character is low) than in the case where the fatigue level of the user character is low (or in the case where the stamina of the user character is high).

This way, the user can or cannot specify one of finely spaced directions as the moving direction of the user character (or the moving direction of the ball 62 when the ball 62 is passed) depending on the fatigue level (or stamina) of the user character. A user interface that makes the user aware of the fatigue level (stamina) of the user character is realized as a result.

[Embodiment 3]

Embodiment 3 differs from Embodiments 1 and 2 in that the stick 44L is used in place of the direction button group 40. Specifically, in Embodiment 3, the user gives an instruction on the moving direction of the user character or the moving direction of the ball 62 kicked by the user character by tilting the stick 44L.

The game device 10 according to Embodiment 3 has the same hardware configuration as that of Embodiment 1 (see FIGS. 1, 2A, and 2B). In Embodiment 3, a soccer game, for example, is run as in Embodiment 1. In other words, the same game space 50 (see FIG. 3) as that of Embodiment 1 is built and the same game screen (see FIG. 4) as that of Embodiment 1 is displayed.

The game device 10 according to Embodiment 3 also includes the same function blocks as those in Embodiment 1 (see FIG. 5). However, the direction obtaining unit 72 in Embodiment 3 differs from those in Embodiments 1 and 2 in that the direction obtaining unit 72 obtains a direction based on a direction in which the stick 44L is tilted.

[Embodiment 3a]

As in Embodiments 1a and 2a, Embodiment 3 may also be configured to make it difficult for a moving-operation target to go over a boundary line and move out of a given area. For example, the user character (or the ball 62) may be designed such that moving off the pitch is difficult for the user character (or the ball 62).

In a case where a direction in which the stick 44L is tilted is a direction between the first basic direction and the second basic direction, the direction obtaining unit 72 in Embodiment 3a sets an upper limit or a lower limit to the angle from the first basic direction or from the second basic direction based on the position of the moving-operation target.

FIG. 20 is a diagram illustrating the function of the direction obtaining unit 72 in Embodiment 3a. Discussed here as an example is a case in which the stick 44L is tilted while the user character in possession of the ball 62 is in the area A9 and a tilt direction Di of the stick 44L is between the upward direction (the first basic direction) and the rightward direction (the second basic direction). The angle between the tilt direction Di of the stick 44L and the upward direction is "30°" and the angle between the tilt direction Di of the stick 44L and the rightward direction is "60°" in this example.

The storage unit 70 in Embodiment 3a stores data that associates information about the position of a moving-operation target with information about an upper limit or a lower limit to the magnitude of the angle from a basic direction. The stored data is, for example, data similar to the lower limit data of FIG. 17.

In this case, "0°" is obtained as the lower limit of the angle from the upward direction that is associated with the area A9 based on the lower limit data of FIG. 17, and with this as an upper limit, the magnitude of the angle from the upward direction is modified.

Because the magnitude of the angle from the upward direction in this example (30°) is larger than the lower limit (0°), the angle from the upward direction remains "30°". Similarly, "0°" is obtained as the lower limit of the angle from the right direction that is associated with the area A9, and with this as an upper limit, the magnitude of the angle from the rightward direction is modified. The magnitude of the angle from the rightward direction in this example (60°) is larger than the lower limit (0°), and the angle from the rightward direction remains "60°". In other words, the direction obtaining unit 72 in this case obtains a direction corresponding to the tilt direction Di of the stick 44L. For example, the tilt direction Di of the stick 44L is obtained as it is.

A contrasting example is discussed in which the stick 44L is tilted while the user character in possession of the ball 62 is in the area A2 and the tilt direction Di of the stick 44L is between the upward direction (the first basic direction) and the rightward direction (the second basic direction). The angle between the tilt direction Di of the stick 44L and the upward direction is "30°" and the angle between the tilt direction Di of the stick 44L and the rightward direction is "60°" in this example.

In this case, "70°" is obtained as the lower limit of the angle from the upward direction that is associated with the area A2 based on the lower limit data of FIG. 17, and with this as an upper limit, the magnitude of the angle from the upward direction is modified. Because the magnitude of the angle from the upward direction in this example (30°) is smaller than the lower limit (70°), the angle from the upward direction is modified to "70°". The direction obtaining unit 72 in this case obtains the direction Do whose angle from the upward direction is "70°" and whose angle from the rightward direction is "20°".

This makes it difficult for the user character (or the ball 62) to move off the pitch as in Embodiments 1a and 2a (see FIG. 12).

[Embodiment 3b]

In Embodiment 3, keeping a moving-operation target from going over a boundary line and moving out of a given area may be accomplished by a different method than that of Embodiment 3a.

Figure 21:
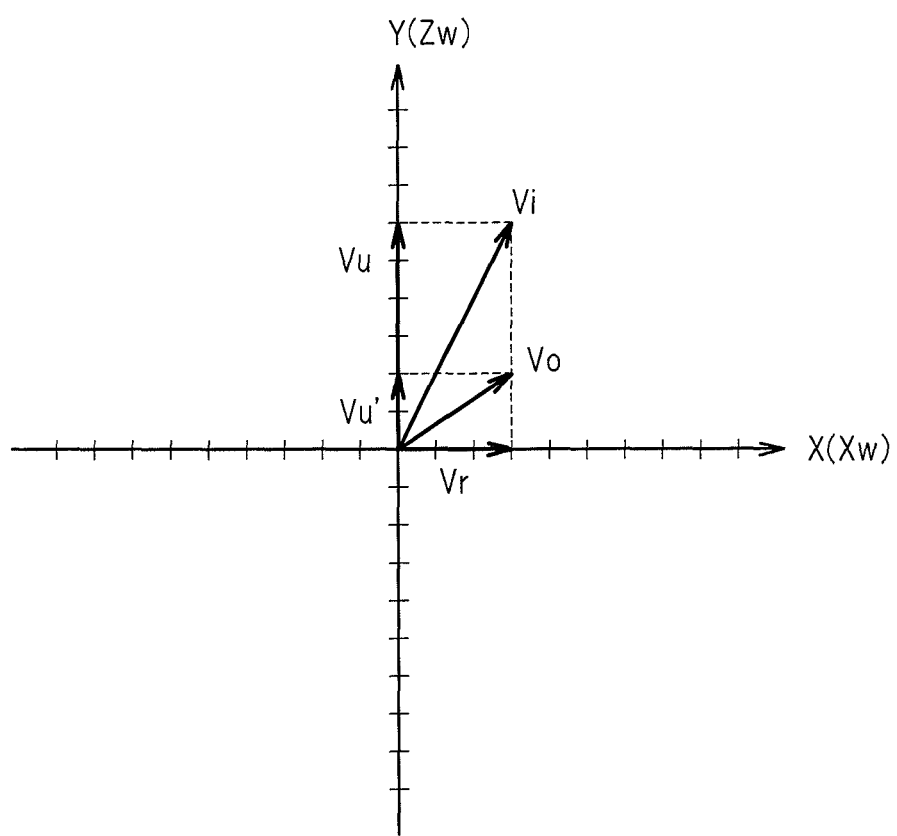
[FIG. 21] A diagram illustrating the function of a direction obtaining UNIT in Embodiment 3b.

FIG. 21 is a diagram illustrating the function of the direction obtaining unit 72 in Embodiment 3b.

In a case where the tilt direction Di of the stick 44L is between the first basic direction and the second basic direction, the direction obtaining unit 72 in Embodiment 3b obtains a tilt direction vector Vi, which corresponds to the tilt direction of the stick 44L. The magnitude of the tilt direction vector Vi indicates how far the stick 44L is tilted.

The direction obtaining unit 72 next splits the tilt direction vector Vi into a first basic direction vector which represents the first basic direction and a second basic direction vector which represents the second basic direction. In the example of FIG. 21, the tilt direction (Vi) of the stick 44L is between the upward direction and the rightward direction, and therefore is split into an upward direction vector Vu and a rightward direction vector Vr. The upward direction vector Vu is a vector that represents the upward direction component of the tilt direction vector Vi and the rightward direction vector Vr is a vector that represents the rightward direction component of the tilt direction vector Vr. The magnitude of the upward direction vector Vu is "6" and the magnitude of the rightward direction vector Vr is "3" in the example of FIG. 21.

After that, the direction obtaining unit 72 sets an upper limit or a lower limit to the magnitude of at least one of the first basic direction vector and the second basic direction vector based on the position of the user character (or the ball 62).

In Embodiment 3b, the storage unit 70 stores data that associates information about the position of a moving-operation target with information about upper limits or lower limits to the magnitudes of a plurality of basic direction vectors. The stored data is, for example, data similar to the upper limit data of FIG. 9.

A case in which the user character in possession of the ball 62 is positioned in the area A2 is discussed here. In the example of FIG. 21, "2" is obtained as the upper limit to the magnitude of the upward direction vector that is associated with the area A2 based on the upper limit data of FIG. 9, and with this as an upper limit, the magnitude of the upward direction vector Vu is modified to "2". An upward direction vector Vu' in FIG. 21 represents the modified upward direction vector.

In the example of FIG. 21, "10" is also obtained as the upper limit to the magnitude of the rightward direction vector that is associated with the area A2 based on the upper limit data of FIG. 9, and with this as an upper limit, the magnitude of the rightward direction vector Vr is modified. Because the magnitude of the rightward direction vector Vr in this example (3) is smaller than the upper limit (10), "3" is maintained as the magnitude of the rightward direction Vr.

The direction obtaining unit 72 obtains a direction represented by a combined vector that is the result of combining the first basic direction vector and the second basic direction vector after the magnitude modification processing is performed. In the example of FIG. 21, the direction obtaining unit 72 obtains a combined vector Vo that is the result of combining the upward direction vector Vu' and the rightward direction vector Vr, and obtains a direction represented by this combined vector Vo.

This makes it difficult for the user character (or the ball 62) to move off the pitch as in Embodiments 1a, 2a, and 3a (see FIG. 12).

[Embodiment 3c]

Embodiment 3 may be configured such that the user is made aware of the ability (or performance) of a moving-operation target as in Embodiments 1b and 2b. For example, the user may be made aware of the ability of the user character.

In Embodiment 3c, the direction obtained by the direction obtaining unit 72 changes in stages in accordance with the tilt direction of the stick 44L. To this end, the direction obtaining unit 72 in Embodiment 3c sets the number of stages of the direction obtained by the direction obtaining unit 72 based on a parameter of the moving-operation target.

The parameter of a moving-operation target is, for example, a parameter related to the ability (performance) of the user character, more specifically, a parameter related to a moving ability or a pass ability.

For example, representative direction data such as the one illustrated in FIG. 22 is stored in Embodiment 3c. The representative direction data of FIG. 22 defines an association relation between information about a range of the tilt direction of the stick 44L and information about a representative direction for each parameter range of the user character.

In the representative direction data of FIG. 22, the tilt direction of the stick 44L is expressed by an angle θi from the upward direction (the positive Y-axis direction) which is an angle measured in a case where the upward direction is 0° and the clockwise direction is the positive direction. A representative direction is also expressed by an angle θo from the upward direction, which is an angle measured in the case where the upward direction is 0° and the clockwise direction is the positive direction.

The direction obtaining unit 72 obtains a direction based on the parameter of the user character, the tilt direction of the stick 44L, and the representative direction data of FIG. 22. In other words, the direction obtaining unit 72 obtains a representative direction associated with the parameter of the user character and with the tilt direction of the stick 44L.

Discussed here is for a case in which the stick 44L is tilted in a direction whose angle from the upward direction (the positive Y-axis direction) is 50°. In this case, in the case where the parameter (for example, moving ability parameter) of the user character has a value equal to or more than a reference value (50), the direction obtaining unit 72 obtains a direction whose angle from the upward direction is "57°" based on the representative direction data of FIG. 22. In the case where the parameter value of the user character is less than the reference value (50), on the other hand, the direction obtaining unit 72 obtains a direction whose angle from the upward direction is "45°" based on the representative direction data of FIG. 22.

Based on the direction obtained by the direction obtaining unit 72, the processing executing unit 74, for example, sets the moving direction of the user character (or the ball 62 kicked by the user character).

In the representative direction data of FIG. 22, the representative direction changes in twelve stages in the case where the parameter (for example, moving ability parameter) of the user character has a value equal to or more than the reference value (50). In the case where the parameter value of the user character is less than the reference value (50), on the other hand, the representative direction changes in eight stages. In short, the number of stages of the representative direction is smaller in the case where the parameter value of the user character is less than the reference value (50) than in the case where the parameter value of the user character is equal to or more than the reference value (50).

The direction obtained by the direction obtaining unit 72 changes more minutely in accordance with the tilt direction of the stick 44L as the number of stages of the representative direction is made larger. In other words, the user can specify one of more finely spaced directions as the moving direction of the user character (or the moving direction of the ball 62 when the ball 62 is passed) as the number of stages of the representative direction is made larger.

According to Embodiment 3c, the user can or cannot specify one of more finely spaced directions as the moving direction of the user character (or the moving direction of the ball 62 when the ball 62 is passed) depending on, for example, the ability (performance) of the user character. A user interface that makes the user aware of the ability (performance) of the user character is thus realized according to Embodiment 3c.

The parameter of the user character may instead be a fatigue level parameter (or a stamina parameter). In this case, the representative direction data of FIG. 22 is set such that the number of stages of the representative direction is smaller in the case where the fatigue level of the user character is higher (or in the case where the stamina of the user character is lower) than in the case where the fatigue level of the user character is lower (or in the case where the stamina of the user character is higher).

This way, the user can or cannot specify one of finely spaced directions as the moving direction of the user character (or the moving direction of the ball 62 when the ball 62 is passed) depending on the fatigue level (or stamina) of the user character. According to Embodiment 3c, a user interface that makes the user aware of the fatigue level (stamina) of the user character is realized as a result.

[Other Embodiments]

Note that the present invention is not limited to the embodiments described-above.

Embodiment 1a and Embodiment 1b may be combined. Embodiment 2a and Embodiment 2b may be combined. Embodiment 3a, Embodiment 3b, and Embodiment 3c may be combined.

For instance, the controller 30 may include a four-way navigation button shaped like a cross instead of the direction button group 40. The four-way navigation button is, for example, a button in which an up depression unit corresponding to the upward direction, a down depression unit corresponding to the downward direction, a left depression unit corresponding to the leftward direction, and a right depression unit corresponding to the rightward direction are formed unitarily.

For instance, the game space may be a two-dimensional game space in which the positions of the player characters and the ball are managed in the form of two coordinate elements.

For instance, the present invention is applicable to the game device 10 that runs other sports games than a soccer game. The game device 10 to which the present invention can be applied may run such games as a basketball game, an ice hockey game, an American football game, a baseball game, a tennis game, and a table tennis game. The present invention is also applicable to the game device 10 that runs other games than sports games (for example, action games, role-playing games, or simulation games).

For instance, the present invention is applicable to other information processing devices than the game device 10.

The invention claimed is:

1. An information processing device, which comprises a plurality of depression units corresponding to a plurality of basic directions and allows a user to give a directional instruction by pressing at least one of the plurality of depression units, the information processing device further comprising:
direction obtaining means for obtaining a direction based on how the plurality of depression units are pressed; and
processing executing means for executing processing based on the direction obtained by the direction obtaining means,
wherein the direction obtaining means comprises:
means for obtaining pressing-force information, which is about pressing forces that are applied respectively to the plurality of depression units; and
means for obtaining, in a case where a first depression unit is pressed and a second depression unit is pressed, among the plurality of depression units, such that a time during which the first depression unit is kept pressed at least partially overlaps with a time during which the second depression unit is kept pressed, a direction between a first basic direction which corresponds to the first depression unit and a second basic direction which corresponds to the second depression unit, based on pressing forces that are applied respectively to the first depression unit and the second depression unit, and
wherein the direction obtained by the direction obtaining means in a case where the first depression unit and the second depression unit are pressed changes based on the pressing forces that are applied respectively to the first depression unit and the second depression unit.

2. The information processing device according to claim 1, wherein, in the case where the first depression unit and the second depression unit are pressed, the direction obtaining means obtains a direction represented by a combined vector which is a result of combining a first basic direction vector and a second basic direction vector, the first basic direction vector representing the first basic direction and having a magnitude corresponding to the pressing force that is applied to the first depression unit, the second basic direction vector representing the second basic direction and having a magnitude corresponding to the pressing force that is applied to the second depression unit.

3. The information processing device according to claim 2, wherein the processing executing means comprises means for moving a moving-operation target based on the direction obtained by the direction obtaining means, and
wherein the direction obtaining means comprises means for setting an upper limit or a lower limit to the magnitude of at least one of the first basic direction vector and the second basic direction vector based on a position of the moving-operation target.

4. The information processing device according to claim 2, wherein the processing executing means comprises means for moving a moving-operation target based on the direction obtained by the direction obtaining means,
wherein the direction obtaining means comprises:
means for obtaining a parameter of the moving-operation target, which is stored in parameter storing means;
means for setting the magnitude of the first basic direction vector so as to change in stages in accordance with the pressing force that is applied to the first depression unit;
means for setting the magnitude of the second basic direction vector so as to change in stages in accordance with the pressing force that is applied to the second depression unit; and means for setting a number of magnitude stages of at least one of the first basic direction vector and the second basic direction vector based on the parameter, and wherein the parameter comprises at least one of a parameter related to an ability or performance of the moving-operation target and a parameter that increases or decreases as the moving-operation target moves or as time elapses.

5. The information processing device according to claim 2, wherein the processing executing means comprises:
   means for moving a moving-operation target;
   means for setting a moving direction of the moving-operation target based on the direction obtained by the direction obtaining means; and
   means for setting a speed at which the moving-operation target moves based on a magnitude of the combined vector.

6. The information processing device according to claim 1, wherein the direction obtaining means comprises:
   means for determining an angle from the first basic direction or from the second basic direction based on the pressing forces that are applied respectively to the first depression unit and the second depression unit; and
   means for obtaining the direction between the first basic direction and the second basic direction based on the determined angle.

7. The information processing device according to claim 6, wherein the processing executing means comprises means for moving a moving-operation target based on the direction obtained by the direction obtaining means, and
   wherein the direction obtaining means comprises means for setting an upper limit or a lower limit to the angle from the first basic direction or from the second basic direction based on a position of the moving-operation target.

8. The information processing device according to claim 6, wherein the processing executing means comprises means for moving a moving-operation target based on the direction obtained by the direction obtaining means,
   wherein the direction obtaining means comprises:
   means for obtaining a parameter of the moving-operation target which is stored in parameter storing means;
   means for determining the angle from the first basic direction or from the second basic direction so as to change in stages in accordance with the pressing forces that are applied respectively to the first depression unit and the second depression unit; and
   means for setting a number of stages of the angle from the first basic direction or from the second basic direction based on the parameter, and
   wherein the parameter comprises at least one of a parameter related to an ability or performance of the moving-operation target and a parameter that increases or decreases as the moving-operation target moves or as time elapses.

9. A method of controlling an information processing device which comprises a plurality of depression units corresponding to a plurality of basic directions and allows a user to give a directional instruction by pressing at least one of the plurality of depression units,
   the method comprising:
   a direction obtaining step of obtaining a direction based on how the plurality of depression units are pressed; and
   a processing executing step of executing processing based on the direction obtained in the direction obtaining step,
   wherein the direction obtaining step comprises the steps of:
   obtaining pressing-force information, which is about pressing forces that are applied respectively to the plurality of depression units; and
   obtaining, in a case where a first depression unit is pressed and a second depression unit is pressed, among the plurality of depression units, such that a time during which the first depression unit is kept pressed at least partially overlaps with a time during which the second depression unit is kept pressed, a direction between a first basic direction which corresponds to the first depression unit and a second basic direction which corresponds to the second depression unit, based on pressing forces that are applied respectively to the first depression unit and the second depression unit, and
   wherein the direction obtained in the direction obtaining step in a case where the first depression unit and the second depression unit are pressed changes based on the pressing forces that are applied respectively to the first depression unit and the second depression unit.

10. A non-transitory computer-readable information storage medium on which is recorded a program for causing a computer which comprises a plurality of depression units corresponding to a plurality of basic directions to function as an information processing device which allows a user to give a directional instruction by pressing at least one of the plurality of depression units,
    the program further controlling a processor of the computer to:
    obtain a direction based on how the plurality of depression units are pressed; and
    execute processing based on the obtained direction,
    wherein to obtain the direction, the program controls the processor to:
    obtain pressing-force information, which is about pressing forces that are applied respectively to the plurality of depression units; and
    obtain, in a case where a first depression unit is pressed and a second depression unit is pressed, among the plurality of depression units, such that a time during which the first depression unit is kept pressed at least partially overlaps with a time during which the second depression unit is kept pressed, a direction between a first basic direction which corresponds to the first depression unit and a second basic direction which corresponds to the second depression unit, based on pressing forces that are applied respectively to the first depression unit and the second depression unit, and
    wherein the obtained direction, in a case where the first depression unit and the second depression unit are pressed, changes based on the pressing forces that are applied respectively to the first depression unit and the second depression unit.

11. An information processing device, which comprises a plurality of depression units corresponding to a plurality of basic directions and allows a user to give a directional instruction by pressing at least one of the plurality of depression units, the information processing device comprising:
    at least one microprocessor configured to obtain pressing-force information about pressing forces that are applied respectively to the plurality of depression units; obtain, in a case where a first depression unit is pressed and a second depression unit is pressed, among the plurality of depression units, such that a time during which the first depression unit is kept pressed at least partially overlaps with a time during which the second depression unit is kept pressed, a direction between a first basic direction which corresponds to the first depression unit and a second basic direction which corresponds to the second depression unit, based on the obtained pressing forces that are applied respectively to the first depression unit and the second depression unit; and execute processing based on the obtained direction, wherein the direction obtained in a case where the first depression unit and the second depression unit are pressed changes based on the pressing forces that are applied respectively to the first depression unit and the second depression unit.

12. The information processing device of claim 1, wherein the first depression unit and the second depression unit are pressed at the same time.

13. The information processing device of claim 1, wherein the first depression unit is pressed and subsequently the second depression unit is pressed.

* * * * *